(12) United States Patent
Takeda et al.

(10) Patent No.: US 10,536,963 B2
(45) Date of Patent: Jan. 14, 2020

(54) USER TERMINAL, RADIO BASE STATION AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Liu Liu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/970,111

(22) Filed: May 3, 2018

(65) Prior Publication Data

US 2018/0255566 A1 Sep. 6, 2018

Related U.S. Application Data

(63) Continuation of application No. PCT/JP2016/082829, filed on Nov. 4, 2016.

(30) Foreign Application Priority Data

Nov. 5, 2015 (JP) .................................. 2015-217913

(51) Int. Cl.
*H04W 72/12* (2009.01)
*H04L 5/00* (2006.01)
*H04W 72/14* (2009.01)

(52) U.S. Cl.
CPC ......... *H04W 72/1284* (2013.01); *H04L 5/001* (2013.01); *H04L 5/0042* (2013.01);
(Continued)

(58) Field of Classification Search
CPC ............. H04W 72/1284; H04W 72/14; H04W 72/0406; H04W 72/12; H04W 72/04;
(Continued)

(56) References Cited

U.S. PATENT DOCUMENTS

| 2013/0121270 | A1 | 5/2013 | Chen et al. |
| 2014/0226608 | A1* | 8/2014 | Seo ....................... H04L 1/0041 370/329 |

(Continued)

FOREIGN PATENT DOCUMENTS

EP 2760171 A2 7/2014

OTHER PUBLICATIONS

International Search Report issued in corresponding International Patent Application No. PCT/JP2016/082829, dated Dec. 27, 2016 (2 pages).

(Continued)

*Primary Examiner* — Thai Nguyen
(74) *Attorney, Agent, or Firm* — Osha Liang LLP

(57) ABSTRACT

A user terminal is disclosed that is configurable with a plurality of component carriers. The user terminal has a receiver that receives at least one of downlink control information and Radio Resource Control (RRC) signaling, a transmitter that transmits uplink control information (UCI), which includes at least delivery acknowledgment information, in a specific resource, by using a specific Physical Uplink Control Channel (PUCCH) format (PF), and a processor that executes control to select the specific PF and the specific resource based on a payload size of at least a part of the UCI.

8 Claims, 17 Drawing Sheets

(52) U.S. Cl.
CPC ........... *H04L 5/0055* (2013.01); *H04W 72/14* (2013.01); *H04L 5/0057* (2013.01)

(58) Field of Classification Search
CPC ..... H04L 1/1671; H04L 5/001; H04L 5/0042; H04L 5/0055; H04L 27/26; H04L 1/0026; H04L 5/0051; H04L 5/005; H04L 1/00; H04L 5/0057; H04L 5/0053; H04J 1/00
See application file for complete search history.

(56) References Cited

U.S. PATENT DOCUMENTS

| | | |
|---|---|---|
| 2017/0006491 A1 | 1/2017 | Chen et al. |
| 2018/0279295 A1* | 9/2018 | Gao .......................... H04L 5/00 |

OTHER PUBLICATIONS

Written Opinion issued in corresponding International Patent Application No. PCT/JP2016/082829, dated Dec. 27, 2016 (4 pages).

Huawei, et al., "Dynamic adaptation of PUCCH formats for HARQ-ACK feedback", 3GPP TSG RAN WG1 Meeting #82bis, R1-155093, Malmo, Sweden, Oct. 5-9, 2015 (7 pages).

NTT DOCOMO, Inc., "Remaining details for multi-cell P-CSI transmission", 3GPP TSG RAN WG1 Meeting #83, R1-157230, Anaheim, USA, Nov. 15-22, 2015 (5 pages).

3GPP TS 36.300 V12.4.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), Dec. 2014 (251 pages).

Extended European Search Report issued in corresponding European Application No. 16862206.6, dated Aug. 27, 2018 (9 pages).

Office Action issued in the counterpart Japanese Patent Application No. 2015-217913, dated Dec. 27, 2016 (15 pages).

Extended European Search Report issued in corresponding European Application No. 19161252.2, dated Jul. 23, 2019 (9 pages).

Nokia Networks; "Summary of email discussion [80-03]: Observations for CA UL control signaling enhancements"; 3GPP TSG-RAN WG1 Meeting #80bis, R1-151835; Belgrade, Serbia; Apr. 20-24, 2015 (9 pages).

* cited by examiner

| ARI values | PFi (i = 3, 4, or 5) |
|---|---|
| 00 | PFi resource 0 |
| 01 | PFi resource 1 |
| 10 | PFi resource 2 |
| 11 | PFi resource 3 |

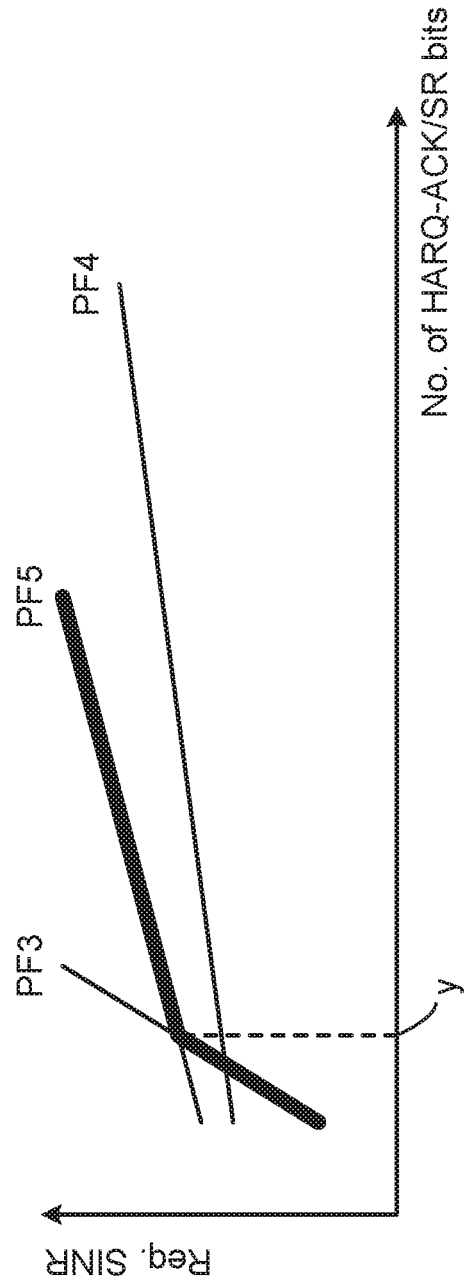

| ARI values | PF4 | PF5 |
|---|---|---|
| 00 | PF4 resource 0 | PF5 resource 0 |
| 01 | PF4 resource 1 | PF5 resource 1 |
| 10 | PF4 resource 2 | PF5 resource 2 |
| 11 | PF4 resource 3 | PF5 resource 3 |

| ARI values | PF3 | PF4 | PF5 |
|---|---|---|---|
| 00 | PF3 resource 0 | PF4 resource 0 | PF5 resource 0 |
| 01 | PF3 resource 1 | PF4 resource 1 | PF5 resource 1 |
| 10 | PF3 resource 2 | PF4 resource 2 | PF5 resource 2 |
| 11 | PF3 resource 3 | PF4 resource 3 | PF5 resource 3 |

USER TERMINAL, RADIO BASE STATION AND RADIO COMMUNICATION METHOD

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2016/082829, filed on Nov. 4, 2016, which is based on and claims the benefit of priority of Japanese Patent Application No. 2015-217913 filed on Nov. 5, 2015. The contents of the aforementioned applications are incorporated herein by reference.

FIELD OF THE INVENTION

The present invention relates to a user terminal, a radio base station and a radio communication method in next-generation mobile communication systems.

BACKGROUND

In the UMTS (Universal Mobile Telecommunications System) network, the specifications of long term evolution (LTE) have been drafted for the purpose of further increasing high speed data rates, providing lower delays and so on (see non-patent literature 1). Also, the specifications of LTE-A (also referred to as LTE-advanced, LTE Rel. 10, 11 or 12) have been drafted for further broadbandization and increased speed beyond LTE (also referred to as LTE Rel. 8 or 9), and successor systems of LTE (also referred to as, for example, FRA (Future Radio Access), 5G (5th generation mobile communication system), LTE Rel. 13 and so on) are under study.

Also, the specifications of LTE-A (also referred to as "LTE-advanced," "LTE Rel. 10," "LTE Rel. 11" or "LTE Rel. 12") have been drafted for further broadbandization and increased speed beyond LTE (also referred to as LTE Rel. 8 or 9), and successor systems of LTE (also referred to as, for example, "FRA" (Future Radio Access), "5G" (5th generation mobile communication system), "LTE Rel. 13" and so on) are under study. Carriers that constitute the fundamental units in carrier aggregation (CA) are referred to as "component carriers" (CCs), and are equivalent to the system band of LTE Rel. 8.

When CA is used, in a user terminal (UE: User Equipment), a primary cell (PCell: Primary Cell), which is a cell with high reliability to ensure connectivity, and a secondary cell (SCell: Secondary Cell) which is an adjunct cell, are configured.

The UE can first connect to the PCell and add the SCell if necessary. PCell is a single cell (standalone cell) that supports RLM (Radio Link Monitoring), SPS (Semi-Persistent Scheduling), and the like. SCell is a cell that is configured in UE in addition to PCell.

SCell is added and deleted by RRC (Radio Resource Control) signaling. SCell is in a deactivated state immediately after being configured in UE, and can only perform communication (scheduling) after being activated.

Also, the specifications of LTE Rel. 8 to 12 have been drafted assuming exclusive operations in frequency bands that are licensed to operators (licensed bands). As licensed bands, for example, the 800 MHz, 2 GHz and/or 1.7 GHz bands are used. Meanwhile, in LTE of Rel. 13 and later versions, operation in frequency bands where license is not required (unlicensed bands) is also a target of study. For unlicensed bands, for example, the 2.4 GHz and/or the 5 GHz band are used as in Wi-Fi (registered trademark).

Although carrier aggregation (LAA: license-assisted access) between licensed bands and unlicensed bands is placed under study in Rel. 13 LTE, there is a possibility that, in the future, dual connectivity (DC) and unlicensed-band stand-alone will becomes targets of study as well.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall description; Stage 2"

SUMMARY

In accordance with embodiments of the invention, a user terminal configurable with a plurality of component carriers, the user terminal comprising: a receiver that receives at least one of downlink control information and Radio Resource Control (RRC) signaling; a transmitter that transmits uplink control information (UCI), which includes at least delivery acknowledgment information, in a specific resource, by using a specific Physical Uplink Control Channel (PUCCH) format (PF); and a processor that executes control to select the specific PF and the specific resource based on a payload size of at least a part of the UCI.

In some aspects of the user terminal, when at least one of the number of bits of the delivery acknowledgment information and a scheduling request included in the UCI is judged to be equal to or less than a predetermined threshold, the processor determines that a PF 3 and a PF 3 resource specified by the downlink control information are the specific PF and the specific resource, and when the number of bits exceeds the predetermined threshold, the control section determines that a PF 4 and a PF 4 resource specified by the downlink control information, or a PF 5 and a PF 5 resource specified by the downlink control information, are the specific PF and the specific resource.

In some aspects of the user terminal, when a plurality of periodic channel state information (P-CSI) are configured to be transmitted at a transmission timing of the UCI and a total payload size of the UCI can be accommodated by a PF and a resource for P-CSI transmission configured by the RRC signaling, the processor determines that the PF and the resource for the P-CSI transmission are the specific PF and the specific resource. In some aspects of the user terminal, when there are a plurality of resources that can accommodate the total payload size of UCI, the processor determines that the PF and the resource for the P-CSI transmission are the specific PF and the specific resource, based on information configured by RRC signaling.

In some aspects of the user terminal, when there is a resource that is specified by the downlink control information that can accommodate the total payload size of UCI, the processor prioritizes the PF, the resource specified by the downlink control information, and determines that the PF and the resource are the specific PF and the specific resource.

In some aspects of the user terminal, when there are no resources for transmission of the plurality of CSIs that can accommodate the total payload size of UCI and the resource specified by the downlink control information, the transmitter drops all of the periodic CSIs and transmits at least one of the delivery acknowledgment information and the scheduling request.

In some aspects of the user terminal, when one P-CSI is configured to be transmitted at the transmission timing of the UCI and the resource specified by the downlink control information is not available, the processor executes control so that the delivery acknowledgment information and the one P-CSI are transmitted using a PF 2a/2b.

In accordance with embodiments of the invention, a radio base station is disclosed that communicates with a user terminal configurable with a plurality of component carriers, the radio base station comprising: a transmitter that transmits at least one of downlink control information and Radio Resource Control (RRC) signaling; and a receiver that receives uplink control information (UCI), which includes at least delivery acknowledgment information, in a specific resource, using a specific Physical Uplink Control Channel (PUCCH) format (PF), wherein the receiver receives the UCI in the specific resource, which is determined in the user terminal based on a payload size of at least a part of the UCI.

In accordance with embodiments of the invention, a radio communication method is disclosed for a user terminal configurable with a plurality of component carriers, the radio communication method comprising: receiving at least one of downlink control information and Radio Resource Control (RRC) signaling; transmitting uplink control information (UCI), which includes at least delivery acknowledgment information, in a specific resource, by using a specific Physical Uplink Control Channel (PUCCH) format (PF); and selecting the specific PF and the specific resource based on a payload size of at least a part of the UCI.

BRIEF DESCRIPTION OF DRAWINGS

FIGS. 6A and 6B are diagrams to illustrate embodiment 1.2-2;

DETAILED DESCRIPTION

Now, in CA in existing systems (LTE Rel. 10 to 12), the number of CCs that can be configured per UE is limited to maximum five. Meanwhile, CA in and after LTE Rel. 13 is required to realize more flexible and high-speed wireless communication, and, for example, a study is in progress to introduce CA enhancement, in which the number of CCs that can be configured per UE in CA is increased, in order to bundle a large number of CCs in a ultra wideband unlicensed band. Increasing the maximum number of CCs will dramatically improve the achievable peak rates.

In CA enhancement, a study is in progress to alleviate the limit on the number of CCs that can be configured per UE and configure six or more CCs (more than 5 CCs). Here, carrier aggregation in which six or more CCs can be configured may be referred to as, for example, "enhanced CA," "Rel. 13 CA," and so on.

In Rel. 13, in order to feed back uplink control information of larger capacity than the existing LTE system, a study is in progress to use new PUCCH formats (PFs). However, it has not been studied seriously as to under what conditions the new PFs should be used, which resources should be assigned to the new PFs, and so on. Unless an appropriate control method is used, the new PFs cannot be effectively used, and throughput reduction and communication quality deterioration may occur.

One or more embodiments of the present invention provide a user terminal, a radio base station and a radio communication method, whereby uplink control information can be fed back adequately even when the number of component carriers that can be configured in a user terminal is expanded.

A user terminal according to aspects of the present invention, in which a plurality of component carriers can be configured, has a receiving section that receives downlink control information and/or RRC (Radio Resource Control) signaling, a transmission section that transmits uplink control information (UCI), which includes at least delivery acknowledgment information, in a specific resource, by using a specific PUCCH format (PF: Physical Uplink Control Channel Format), and a control section that selects the specific PF and the specific resource based on a payload size of at least a part of the UCI.

According to one or more embodiments of the present invention, uplink control information can be fed back adequately even when the number of component carriers that can be configured in a user terminal is expanded from that of existing systems.

Figure 1:
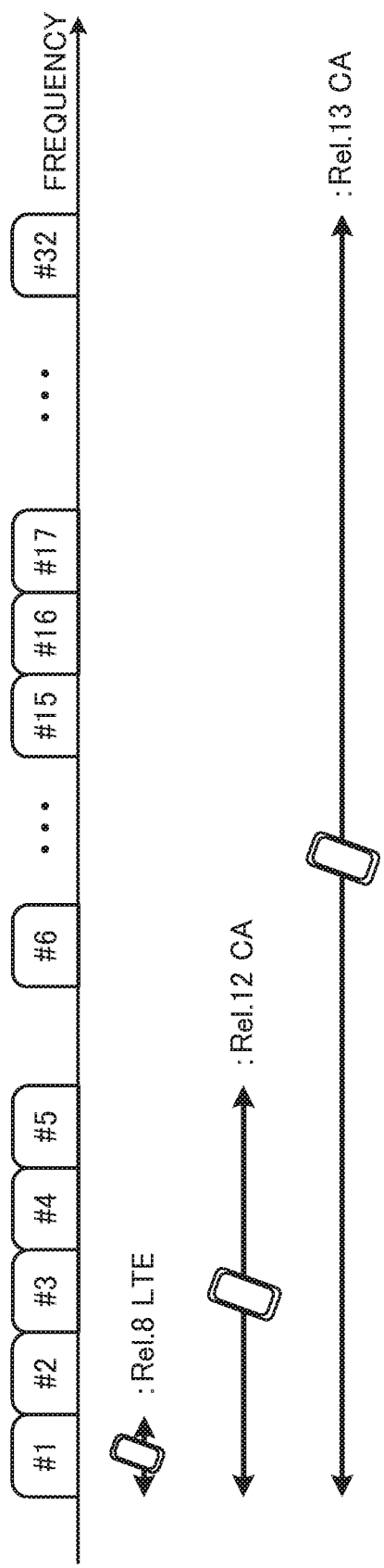
FIG. 1 is a diagram to explain carrier aggregation.

FIG. 1 is a diagram to explain carrier aggregation. As shown in FIG. 1, in CA of up to LTE Rel. 12, maximum five component carriers (CCs) (CC #1 to CC #5) are bundled, where the system band of LTE Rel. 8 constitutes one unit.

That is, in CA up to LTE Rel. 12, the number of CCs that can be configured per UE is limited to a maximum of five.

On the other hand, in CA of LTE Rel. 13, a study is in progress to expand the bandwidth further by bundling six or more CCs. That is, in CA of LTE Rel. 13, expansion of the number of CCs (cells) that can be configured per UE to six or more (CA enhancement) is being studied. For example, as shown in FIG. 1, when 32 CCs (CC #1 to CC #32) are bundled, a bandwidth of maximum 640 MHz can be secured.

More flexible and faster radio communication is expected to be made possible by reducing the limit on the number of CCs that can be configured per UE. Also, expanding the number of CCs like this is an effective way to widen the band based on CA (LAA: License-Assisted Access) between licensed bands and unlicensed bands. For example, five licensed band CCs (=100 MHz) and fifteen unlicensed band CCs (=300 MHz) are bundled, and a bandwidth of 400 MHz can be secured.

By the way, in the existing system (LTE Rel. 8-12), uplink control information (UCI) is fed back from the UE to a device on the network side (for example, a radio base station (eNB: eNodeB)). The UE may transmit UCI on the uplink shared channel (PUSCH: Physical Uplink Shared Channel) at the timing when the uplink data transmission is scheduled. The radio base station performs data retransmission control and scheduling control on the UE based on the received UCI.

UCI in existing includes systems channel state information (CSI: Channel State Information), which includes at least one of channel quality indicator (CQI), precoding matrix indicator (PMI), precoding type indicator (PTI), and rank indicator (RI), and includes delivery acknowledgment information for downlink signals (for example, downlink shared channel (PDSCH: Physical Downlink Shared Channel)). Further, the delivery acknowledgment information may be referred to as "HARQ-ACK (Hybrid Automatic Repeat reQuest Acknowledgment)," "ACK/NACK (A/N)," "retransmission control information," and the like.

For example, in existing systems, periodic CSI (P-CSI) reporting, in which the UE transmits CSI in subframes of a predetermined period, is supported. To be more specific, UE receives (as configuration) the transmission subframe information for P-CSI from eNB by way of higher layer signaling (for example, RRC signaling). The transmission subframe information here refers to information that indicates the subframe to transmit P-CSI (hereinafter also referred to as a "reporting subframe"), and at least the cycle (interval) of this transmission subframe and the offset value of this transmission subframe with respect to the beginning of the radio frame are included. The UE transmits P-CSI in the transmission subframe of a predetermined cycle indicated by the transmission subframe information.

Feedback (UCI on PUCCH) using an uplink control channel (PUCCH: Physical Uplink Control Channel) and feedback (UCI on PUSCH) using an uplink shared channel (PUSCH: Physical Uplink Shared Channel) are defined as UCI feedback methods. For example, if there is uplink user data, the UE transmits P-CSI using the PUSCH. On the other hand, if there is no uplink user data, the UE transmits P-CSI using the PUCCH.

UCI on PUSCH is used when UCI transmission and PUSCH transmission overlap within one TTI (Transmission Time Interval) (for example, one subframe). In this case, UCI may be mapped to the PUCCH resource and simultaneous PUCCH-PUSCH transmission may be performed, or UCI may map to radio resources in the PUSCH region and only PUSCH transmission may be performed.

Here, when the number of CCs (cells) that can be configured per user terminal is expanded to six or more (for example, 32), it is necessary to make it possible to transmit delivery acknowledgment information (HARQ-ACKs) in response to downlink signals from six or more CCs. For this reason, in LTE Rel. 13, a new PUCCH format is being considered which can transmit delivery acknowledgment information of more CCs than existing PUCCH formats (for example, PFs 1a/1b, 3, etc.) (that is, format that can transmit a larger number of bits).

The new PUCCH format is expected to have larger capacity than existing PUCCH formats 2, 2a, 2b and 3 that can transmit one CC's P-CSI. For example, while PF 3 can transmit up to 10 bits when FDD is used (Frequency Division Duplexing) and transmit up to 21 bits when TDD is used, a new PF may be comprised of radio resources capable of transmitting 64 to 256 bits (for example, radio resources capable of transmitting 128 bits).

Figure 2A:
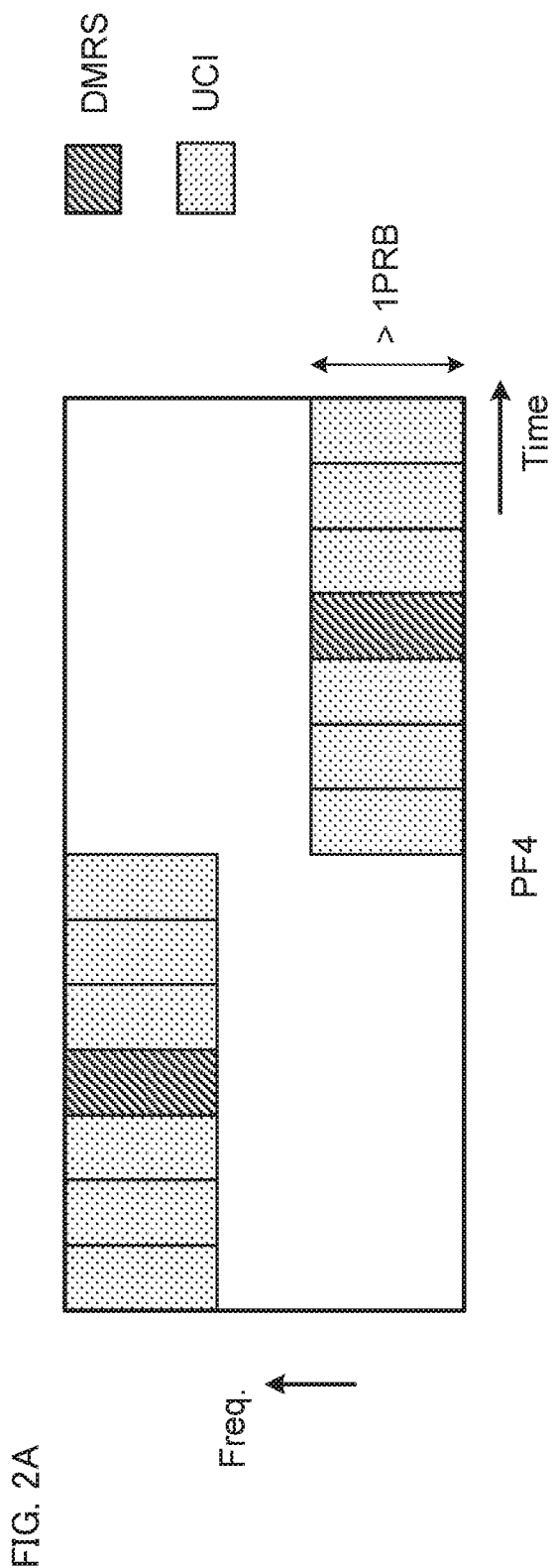
FIG. 2A and FIG. 2B are diagrams to show examples of radio resource allocation in new PUCCH formats in accordance with embodiments of the invention.

FIG. 2 is a diagram to show an example of radio resource allocation in new PUCCH formats in accordance with embodiments of the invention. For example, as shown in FIG. 2A, a new PUCCH format resembling the existing PUSCH (PUSCH-like new PUCCH Format) is studied. The new PUCCH format may be called PUCCH format 4 (PF 4).

PF 4 is being studied as a format having the following characteristics:
(1) Code division multiplexing (CDM) is not supported;
(2) Frequency resources of one or more PRBs (for example, 1, 2, . . . , 6, 8, 9, . . . ) are supported;
(3) The number of DMRS symbols per slot is 1; and
(4) A PUCCH resource index is specified by a combination of a starting PRB index and the number of PRBs.

Figure 2B:
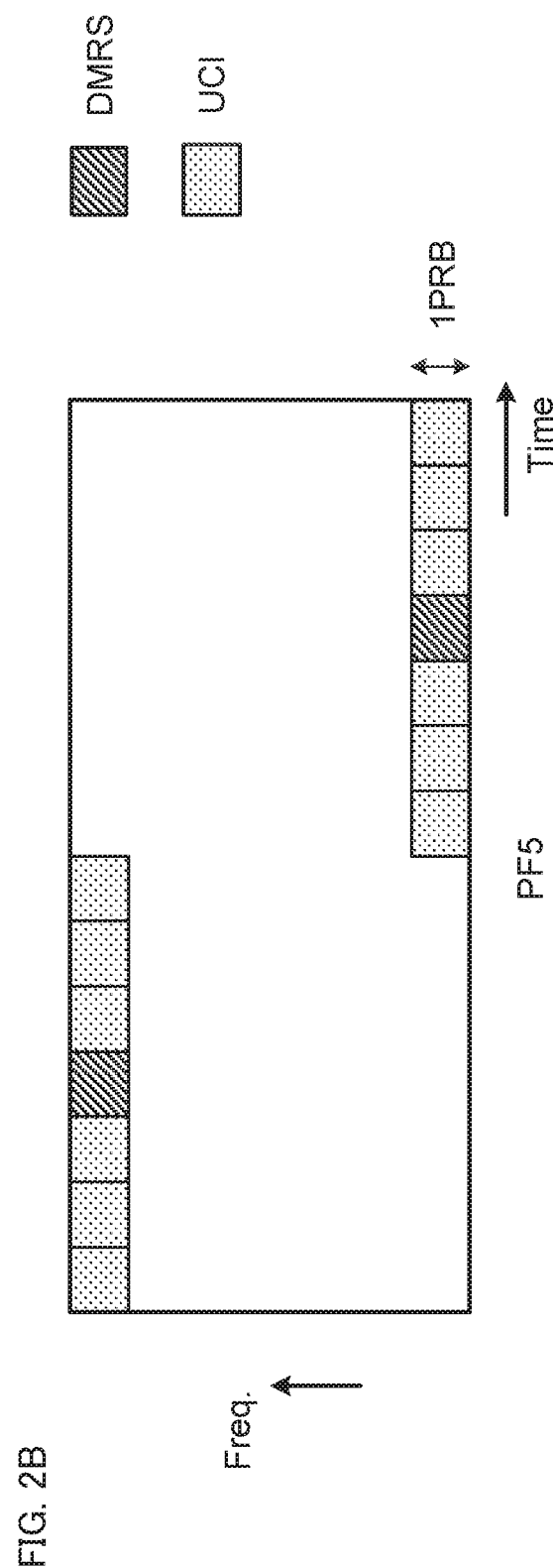

In addition, the CDM-based new PUCCH format shown in FIG. 2B is also studied. The new PUCCH format may be called PUCCH format 5 (PF 5).

PF 5 is studied as a format having the following characteristics:
(1) In each symbol (SC-FDMA symbol), CDM with a predetermined spreading factor (for example, spreading factor 2) is applied;
(2) Only one PRB of frequency resources are supported;
(3) The number of DMRS symbols per slot is 1; and
(4) A PUCCH resource index is specified by a combination of a PRB index and a CDM index.

In PF 5, for example, six data symbols are spread over one PRB (12 subcarriers) using [+1, +1] or [+1, −1] as orthogonal codes (spreading codes). Note that frequency hopping is expected to be applied to both PF 4 and PF 5 as shown in FIGS. 2A and 2B.

Further, PF 4 and/or PF 5 may have at least one of the above characteristics, and may be configured to have different characteristics.

In the conventional LTE system, regardless of the number of scheduled CCs, the UE determines the number of HARQ-ACK bits to be fed back (HARQ-ACK codebook size) based on the configured CCs and the transmission mode. Further, the PF to use for HARQ-ACK feedback is determined depending on whether or not an ACK/NACK resource indicator (ARI: Ack/nack Resource Indicator) is included in downlink control information (for example, DCI (Downlink Control Information)), which is the scheduling information of the corresponding downlink shared channel. When ARIs are included in DCI, the resources to use for PF is determined based on the correspondence relationship between ARIs and PUCCH resources configured by RRC signaling.

On the other hand, in PUCCH transmission of HARQ-ACKs in Rel. 13, it is required to dynamically select between conventional PF 3 and additional new PF. However, a control method that specifically realizes such dynamic and adaptive use of PFs (a method of switching and using multiple PFs) has not been studied.

In Rel. 13, it is also being studied to transmit P-CSIs of multiple cells (multi-cell P-CSIs) using PF 4. In this case, a study is in progress to limit the maximum payload size (or coding rate) that can be supported by using higher layer signaling (for example, RRC signaling, broadcast information etc.).

For example, in the same subframe, when transmission of P-CSIs of a plurality of CCs (cells) exceeding the maximum payload size that the PF can support is generated, the UE will drop the transmission of the P-CSIs of some or all of the CCs selected according to a predetermined priority rule, and transmit the P-CSIs of the remaining CCs. As a priority rule, for example, it is possible to preferentially transmit the P-CSI of a cell, in which the index, provided to specify the serving cell (ServCellIndex), is small.

Figure 3:
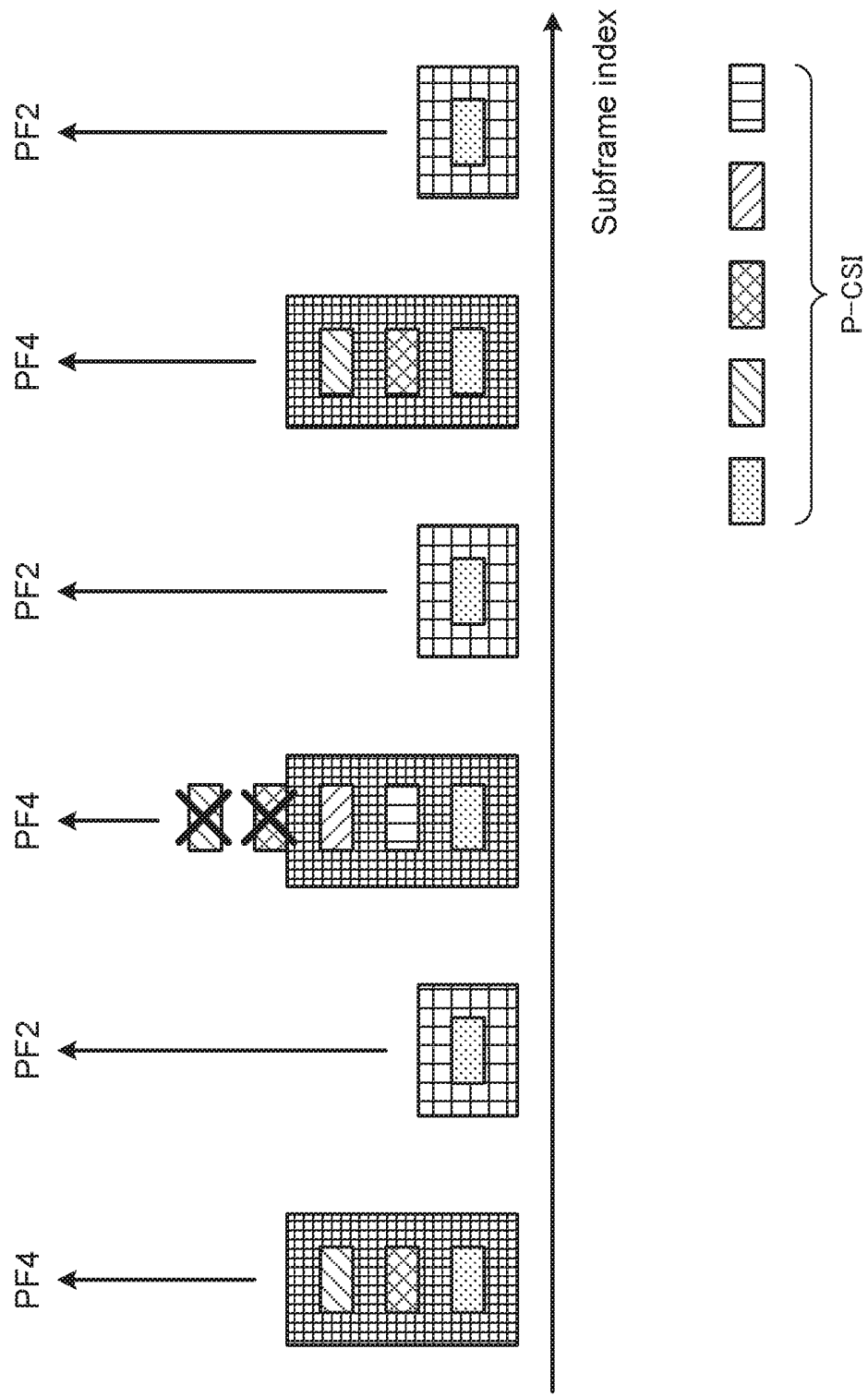
FIG. 3 is a diagram to show an example of multi-cell P-CSI reporting when using PF 4 in accordance with embodiments of the invention.

FIG. 3 is a diagram to show an example of multi-cell P-CSI reporting when PF 4 is used. In this example, the maximum payload size of PF 4 is configured to support P-CSIs of three cells. As shown in FIG. 3, when the P-CSIs to be transmitted at a predetermined timing exceed the maximum payload size, the UE drops at least one P-CSI so that the size of the UCI is less than or equal to the maximum payload size.

HARQ-ACK feedback may occur at the same time at the timing when P-CSI transmission is configured (for example, subframe). However, no research has been done on how to determine the maximum number of CSI and HARQ-ACK/SR bits to be transmitted in PF4. In addition, it is possible to use other PFs to feed back P-CSIs, in which case the same consideration is required (PF 3, PF 5, etc.).

As explained above, at present, in Rel. 13 CA, the method of determining PFs to use for UCI and the PUCCH resources corresponding to each PF, etc. have not been studied seriously. Consequently, inconsistencies may arise between the UE and the eNB regarding how to use the uplink channel. That is, unless an appropriate control method is used, a new PF cannot be effectively used, and throughput reduction and communication quality deterioration may occur.

Therefore, the present inventors have come up with the idea of controlling (selecting) PFs and resources to use for feedback of UCI, at least including HARQ-ACKs, based on predetermined conditions. To be more specific, according to an example of the present invention, control can be performed to dynamically switch and use PFs and/or resources, based on, for example, whether transmission of multiple cells' P-CSIs is configured at the transmission timing (for example, subframe) of UCI including HARQ-ACKs and/or based on the comparison result of the payload size of at least a part of the UCI with a predetermined value.

Now, embodiments of the present invention will be described below. Now, although example cases will be described with the following embodiments in which CA to use maximum 32 CCs is configured in user terminals, the application of the present invention is by no means limited to this. For example, the methods to be described with the embodiments can be used even when CA to use five or fewer CCs is configured.

Further, in the following embodiments, a case where a PUCCH is transmitted for each cell group (CG: Cell Group) composed of one or more CCs will be explained. The concerned CG may be called, for example, PUCCH CG or PUCCH group. The present invention is also applicable to CA that does not use PUCCH CG.

In this specification, the phrase "HARQ-ACK/SR" or "acknowledgment information and/or scheduling request" means that "at least HARQ-ACK is included, but SR may or may not be included."

Hereinafter, the resources to use when transmitting only a plurality of P-CSIs are also referred to as "resources for multiple P-CSIs," "resources for P-CSIs," and the like. Also, resources used when only a plurality of HARQ-ACKs are transmitted are also referred to as "resources for multiple HARQ-ACKs," "resources for HARQ-ACKs" and the like. Nor that SRs may be transmitted in these resources.

(Radio Communication Method)

Regarding the radio communication method in one example of the present invention, hereinafter, a case where only HARQ-ACKs/SRs are fed back in predetermined subframes (first embodiment) and a case where HARQ-ACKs/SRs and CSIs are transmitted (second embodiment) will be described in detail. Each of the following embodiments will be described on the premise that the UE can specify the PUCCH resources based on ARIs. That is, the UE can transmit UCI in at least one of PF 3, PF 4 and PF 5.

<First Embodiment>

The first embodiment relates to a PF/resource selection method used when only HARQ-ACK/SR is transmitted. At least one of embodiments 1.1-1.3 is used depending on how many correspondence relationships between PUCCH resources and ARIs are configured in the UE.

[Embodiment 1.1]

Embodiment 1.1 relates to a method of PF selection applied to a UE when a resource set of only one PF is configured for an ARI (correspondence between an ARI and only one PF's resource set is configured).

Figures 4A, 4B:
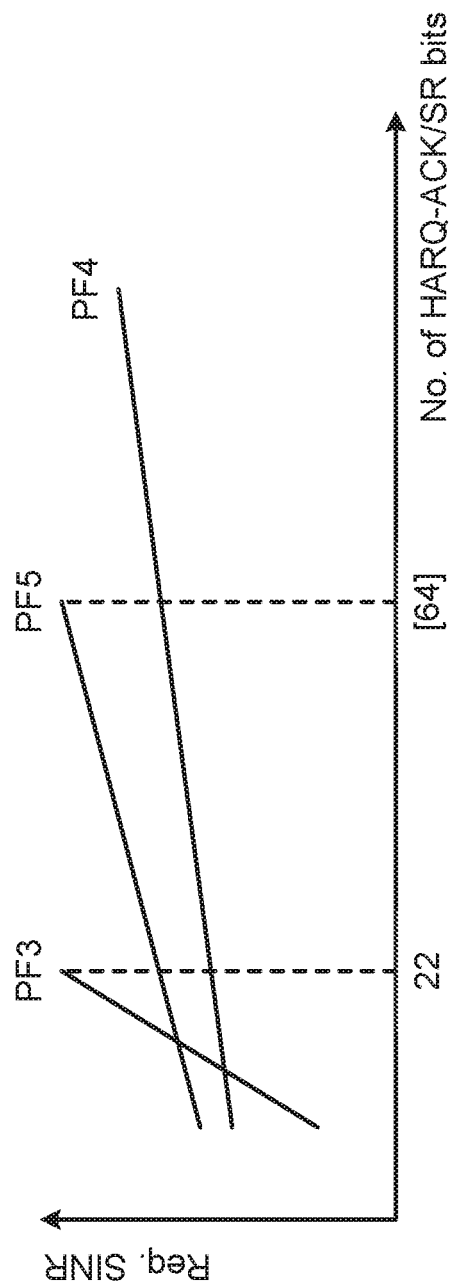
FIGS. 4A and 4B are diagrams to illustrate embodiment 1.1.

FIGS. 4A and 4B are diagrams to explain embodiment 1.1. FIG. 4A is a diagram to show an example of correspondence between ARIs and PF resources in embodiment 1.1. In embodiment 1.1, only one PF (PFi) (i=3, 4, or 5) is associated with an ARI, as shown in FIG. 4A. Note that the resource size of PFi may be configured differently for each corresponding ARI, or may be configured to be the same.

FIG. 4B is a diagram to show an example of the relationship between the number of HARQ-ACK/SR bits and the required SINR in embodiment 1.1. The tendency that the required SINR increases as the number of bits to be transmitted increases is common to any PF.

If an ARI is associated only with PF 3 resources, the UE transmits HARQ-ACK/SR in PF 3. The network (for example, eNB) performs control (including determining resources, reporting the correspondence, etc.) considering that PF 3 can transmit up to a predetermined number of bits (for example, 22 bits). In PF 3, the required SINR increases suddenly as the number of bits increases, but the required SINR can be kept lowest when the number of bits is small.

When an ARI is associated only with PF 4 resources, the UE transmits HARQ-ACK/SR in PF 4. In PF 4, the number of bits that can be transmitted is not limited (for example, transmission using 8 PRBs is possible). PF 4 has the smallest SINR increase rate among the three PFs.

When an ARI is associated only with PF 5 resources, the UE transmits HARQ-ACKs/SRs in PF 5. The network performs control, considering that PF 5 can transmit up to a predetermined number of bits (for example, 64 bits). In PF 5, the payload is smaller and the encoding gain is lower than in PF 4, and therefore the required SINR of PF 5 is basically higher than the required SINR of PF 4.

According to above-described embodiment 1.1, it is possible to uniquely determine HARQ-ACK/SR feedback using the PFs configured in association with ARIs and their resources.

For this reason, it is possible to suppress the occurrence of inconsistency in the recognition of the PUCCH including the HARQ-ACKs between the UE and the eNB.

[Embodiment 1.2]

Embodiment 1.2 relates to a PF selection method applied to the UE when two PF resource sets are configured in the ARI (associated with the ARI). The UE selects the PF to use for transmission based on the number of HARQ-ACK/SR bits. Below, a case where PF 3 and PF 4 resources are configured (embodiment 1.2-1), a case where PF 3 and PF 5 resources are configured (embodiment 1.2-2), and a case where PF 4 and PF 5 resources are configured (embodiment 1.2-3) each will be explained in detail.

Figures 5A, 5B:
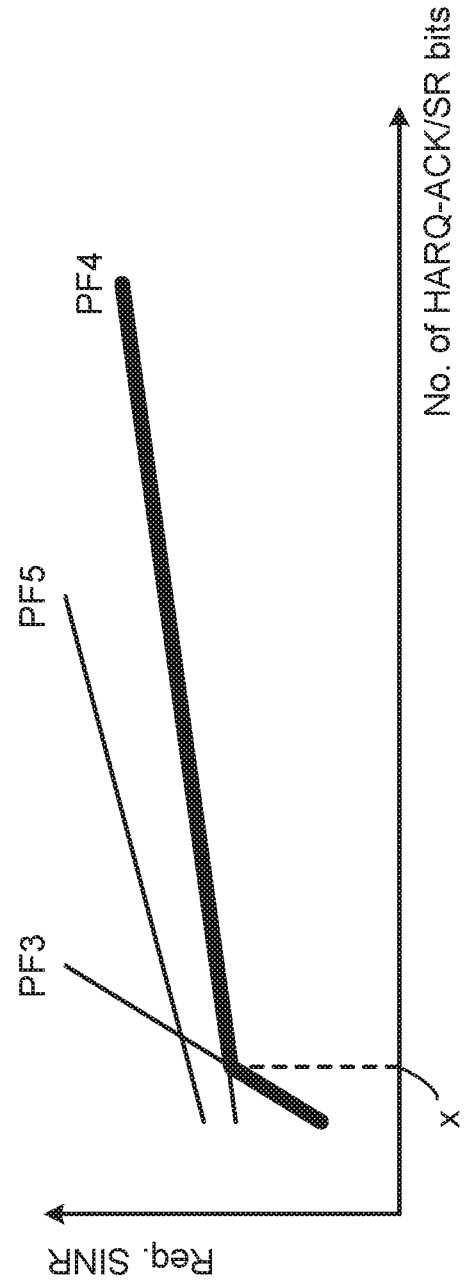
FIGS. 5A and 5B are diagrams to illustrate embodiment 1.2-1.

FIGS. 5A and 5B are diagrams to explain embodiment 1.2-1. FIG. 5A is a diagram to show an example of correspondence between ARIs and PF resources in embodiment 1.2-1. In embodiment 1.2-1, resources of two PFs (PF 3 and PF 4) are associated with ARIs as shown in FIG. 5A.

FIG. 5B is a diagram to show an example of the relationship between the number of HARQ-ACK/SR bits and the required SINR in embodiment 1.2-1. The bold line in the figure corresponds to the required SINR required to achieve the predetermined error rate in embodiment 1.2-1. According to embodiment 1.2-1, the PF can be selected so that the required SINR is as low as possible.

In embodiment 1.2-1, if the UE determines that the number of HARQ-ACK/SR bits is less than or equal to a predetermined threshold, the UE uses PF 3, and, otherwise (the number of HARQ-ACK/SR bits exceeds the predetermined threshold), the UE uses PF 4. Note that the threshold is preferably 22 or less. In FIG. 5B, x (22 or less) is configured as a predetermined threshold, showing that PF 3 is used when the number of HARQ-ACK/SR bits is x bits or less, and that PF 4 is used when the number of bits is greater than x bits.

The threshold used for PF switching may be reported from the network to the UE using higher layer signaling (for example, RRC signaling), downlink control information (for example, DCI), or a combination of these. Further, the threshold may be stored in advance in the UE.

FIGS. 6A and 6B are diagrams to explain embodiment 1.2-2. FIG. 6A is a diagram to show an example of correspondence between ARIs and PF resources in embodiment 1.2-2. In embodiment 1.2-2, resources of two PFs (PF 3 and PF 5) are associated with ARIs, as shown in FIG. 6A.

FIG. 6B is a diagram to show an example of the relationship between the number of HARQ-ACK/SR bits and the required SINR in embodiment 1.2-2. The thick line in the figure corresponds to the required SINR achieved in embodiment 1.2-2. According to embodiment 1.2-2, the PF can be selected so that the required SINR is as low as possible.

In embodiment 1.2-2, when the UE determines that the number of HARQ-ACK/SR bits is equal to or less than a predetermined threshold, the UE uses PF 3, and, otherwise (when the number of HARQ-ACK/SR bits exceeds the predetermined threshold), the UE transmits PF 5. Note that the threshold is preferably 22 or less. In FIG. 6B, y (22 or less) is configured as a predetermined threshold, showing that PF 3 is used when the number of HARQ-ACK/SR bits is y bits or less and PF 5 is used when the number of bits is larger than y bits.

Figures 7A, 7B:
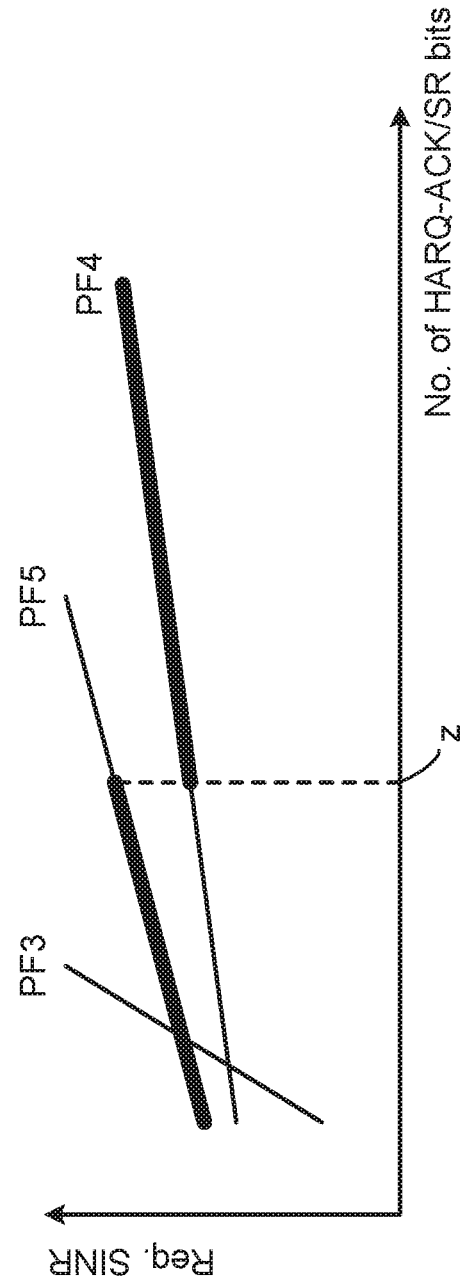
FIGS. 7A and 7B are diagrams to illustrate embodiment 1.2-3.

FIGS. 7A and 7B are diagrams to explain embodiment 1.2-3. FIG. 7A is a diagram to show an example of correspondence between ARIs and PF resources in embodiment 1.2-3. In embodiment 1.2-3, resources of two PFs (PF 4 and PF 5) are associated with ARIs, as shown in FIG. 7A.

FIG. 7B is a diagram to show an example of the relationship between the number of HARQ-ACK/SR bits and the required SINR in embodiment 1.2-3. The bold line in the figure corresponds to the required SINR achieved in embodiment 1.2-3. According to embodiment 1.2-3, even UEs where PF 4 is configured have opportunities to make transmission in PF 5, so that it is possible to increase the number of UEs to multiplex on the same resources using PF 5 in the network, so that the overhead associated with uplink transmission can be reduced.

In embodiment 1.2-3, when the UE determines that the number of HARQ-ACK/SR bits is equal to or less than a predetermined threshold, the UE uses PF 5, otherwise (when the number of HARQ-ACK/SR bits exceeds the predetermined threshold) the UE uses PF 4. Note that the threshold is preferably, for example, 64 or less. In FIG. 7B, z (64 or less) is configured as the predetermined threshold, showing that PF 5 is used when the number of HARQ-ACK/SR bits is less than or equal to z bits and PF 4 is used when the number of bits is larger than z bits.

According to above-described embodiment 1.2, the UE can determine whether dynamic PF adaptation (switching use of multiple PFs) is applied based on whether or not multiple PF resource sets are configured in ARIs. That is, depending on the configurations of the network, it is possible to support both operations using fixed PFs and operation using dynamic PF adaptation. Also, since it is not necessary to configure information to indicate that the eNB adopts dynamic PF adaptation, additional RRC signaling indicating that piece of information is not required, and therefore the communication overhead can be reduced.

[Embodiment 1.3]

Embodiment 1.3 relates to the PF selection method applied to the UE when three PF resource sets are configured in ARIs (associated with ARIs). The UE selects the PF to use for transmission based on the number of HARQ-ACK/SR bits. Hereinafter, a case where resources of PF 3, PF 4 and PF 5 are configured will be described in detail.

Figures 8A, 8B:
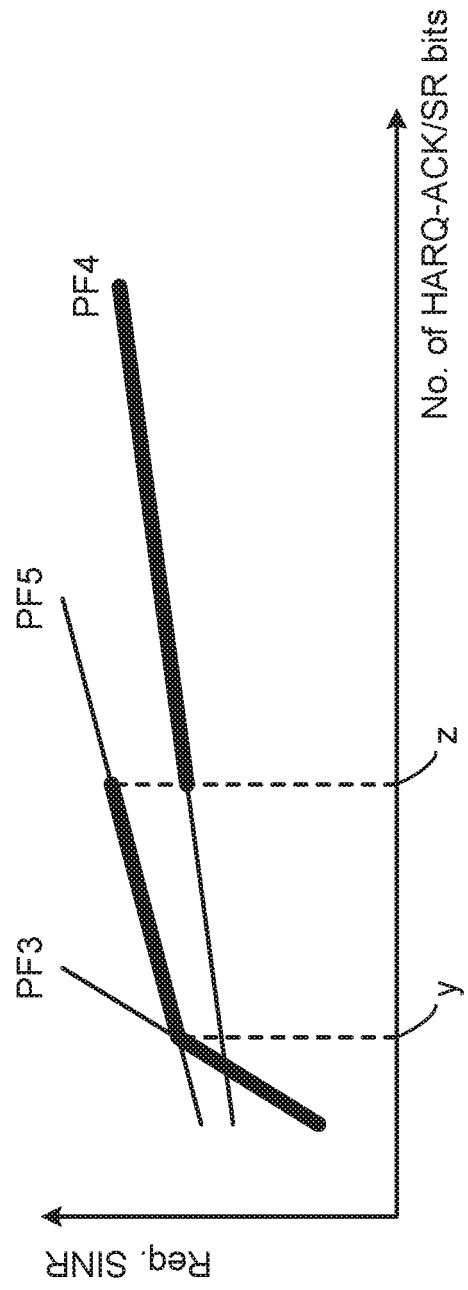
FIGS. 8A and 8B are diagrams to illustrate embodiment 1.3.

FIGS. 8A and 8B are diagrams to explain embodiment 1.3. FIG. 8A is a diagram to show an example of correspondence between ARIs and PF resources in embodiment 1.3. In embodiment 1.3, resources of three PFs (PF 3, PF 4 and PF 5) are associated with ARIs, as shown in FIG. 8A.

FIG. 8B is a diagram to show an example of the relationship between the number of HARQ-ACK/SR bits and the required SINR in embodiment 1.3. The bold line in the figure corresponds to the required SINR achieved in embodiment 1.3.

In embodiment 1.3, the UE uses PF 3 when determining that the number of HARQ-ACK/SR bits is less than or equal to a first threshold and uses PF 5 when determining that the number of bits is greater than the first threshold and less than or equal to a second threshold, and, otherwise (when the number of HARQ-ACK/SR bits is larger than the second threshold), the UE uses PF 4. Preferably, for example, the first threshold is 22 or less and the second threshold is 64 or less. In FIG. 8B, y (22 or less) is configured as the first threshold and z (64 or less) is configured as the second threshold, showing that PF 3 is used when the number of HARQ-ACK/SR bits is y bits or less, PF 5 is used when the number of bits is greater than y bits and less than or equal to z bits, and PF4 is used when the number of bits is larger than z bits.

The threshold used for PF switching may be reported from the network to the UE using higher layer signaling (for example, RRC signaling), downlink control information (for example, DCI), or a combination thereof. Note that the threshold may be stored in the UE in advance.

According to above-described embodiment 1.3, like embodiment 1.2, the UE can determine whether dynamic PF adaptation (switching use of multiple PFs) is applied, based on whether or not multiple PF resource sets are configured in ARIs. Also, even UEs where PF 4 is configured have opportunities to make transmission in PF 5, so that it is possible to increase the number of UEs to multiplex on the same resources using PF 5 in the network, so that the overhead associated with uplink transmission can be reduced.

In the example described in the first embodiment, ARI is formed of two bits, and four PUCCH resources are configured by RRC signaling in each PF, but this is not limiting. For example, ARIs may be one bit or three bits or more, and the number of PUCCH resources configured in PF is not limited to 4.

Note that the threshold x (and/or y) described above in FIGS. 5 to 8 may be any one of 10, 11, 21, 22, 47 and 48, for example. Further, the above-mentioned threshold z may be any one of 21, 22, 31, 32, 47, 48, 63 and 64, for example. The thresholds x, y and z are not limited to these values and may be configured to other values.

<Second Embodiment>

The second embodiment relates to PF/resource selection method in the case of transmitting HARQ-ACK/SR and CSI.

Figure 9:
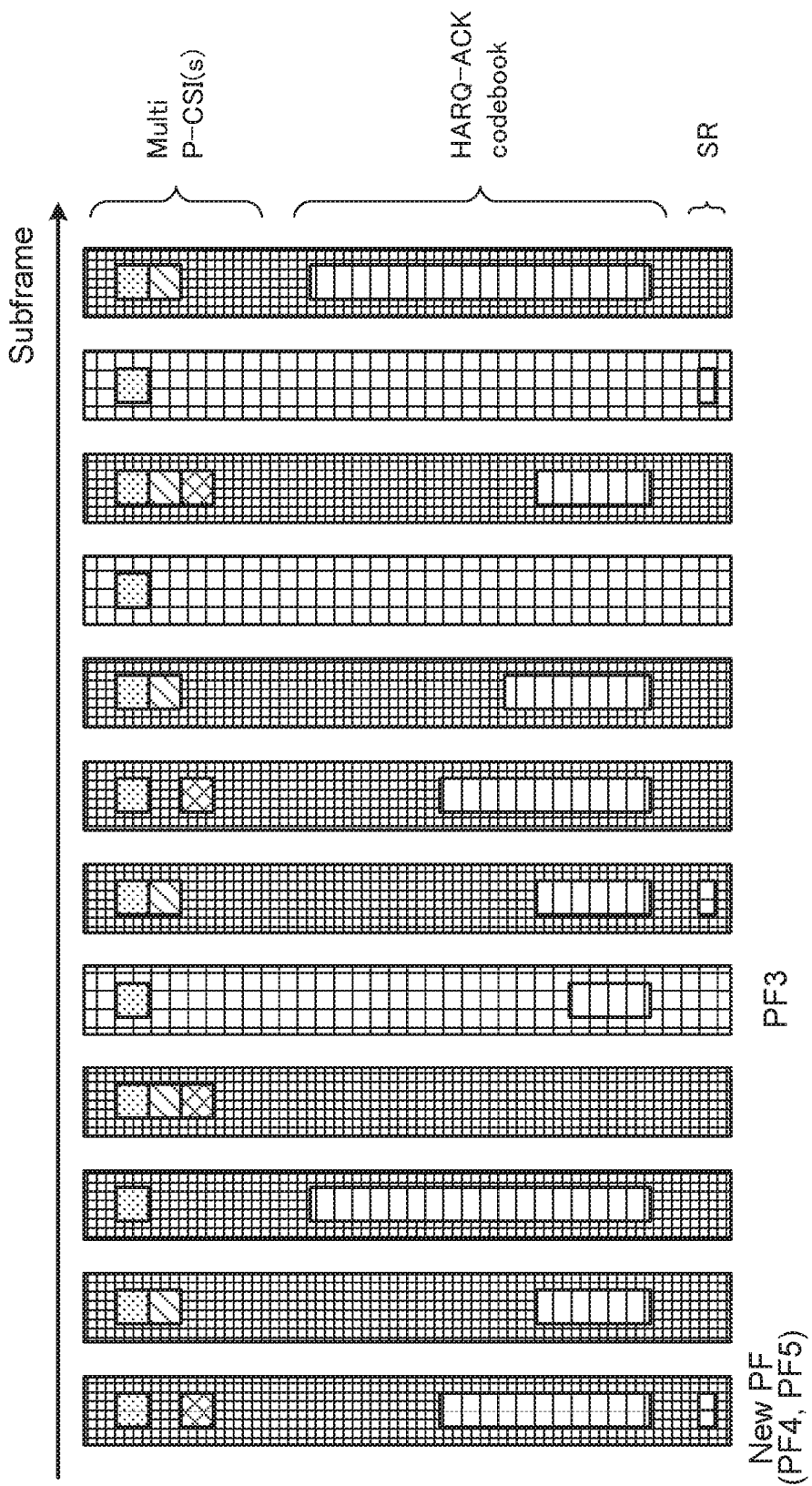
FIG. 9 is a diagram to explain the concept of information included in PUCCH in accordance with embodiments of the invention.

First, the background of the present inventors leading to the second embodiment will be explained. The present inventors considered the information contained in the PUCCH. FIG. 9 is a diagram to explain the concept of information included in the PUCCH. When transmission of multiple cells' P-CSIs is configured in the UE, as shown in FIG. 9, the number of P-CSIs, the HARQ-ACK codebook size, and whether or not SR is sent will differ for each PUCCH being transmitted. Note that the information to be included in the PUCCH in each PF (PF 3, PF 4 and PF 5) can be jointly encoded.

The inventors of the present invention focused on the fact that the payload size of various information included in the PUCCH dynamically changes for each subframe, and the present inventors came up with the idea of determining PFs and resources to use for UCI based on the payload size of all or part of the UCI.

The second embodiment is based on the premise that multiple cells' P-CSIs are transmitted using at least one of PF 3, PF 4 and PF 5. The PF for transmitting multiple cells' P-CSIs and the PUCCH resource of the PF may be preconfigured by higher layer signaling (for example, RRC signaling). Note that the second embodiment is not limited to the case of transmitting a plurality of CSIs and can be applied to the case of transmitting HARQ-ACK/SR and one or more CSIs.

[Embodiment 2.1]

In embodiment 2.1, the UE determines the PF and resources to use for UCI transmission based on the HARQ-ACK/SR payload. In embodiment 2.1, PFs/resources for P-CSI are configured, and, even when P-CSI is included in UCI, UCI is transmitted using PFs and resources specified by ARIs.

When resources of only one PF (for example, PFi) are configured as PF resources corresponding to ARIs, the UE multiplexes HARQ-ACK/SR and CSI using this PFi. Also, when resources of multiple PFs (for example, PFi and PFj) are configured as PF resources corresponding to ARIs, the UE selects one PF based on the number of bits of HARQ-ACK bits, and then multiplexes HARQ-ACK/SR and CSI using the selected PF. Here, when selecting a PF based on the number of HARQ-ACK bits, the PF selection method described in the first embodiment can be used.

Figure 10:
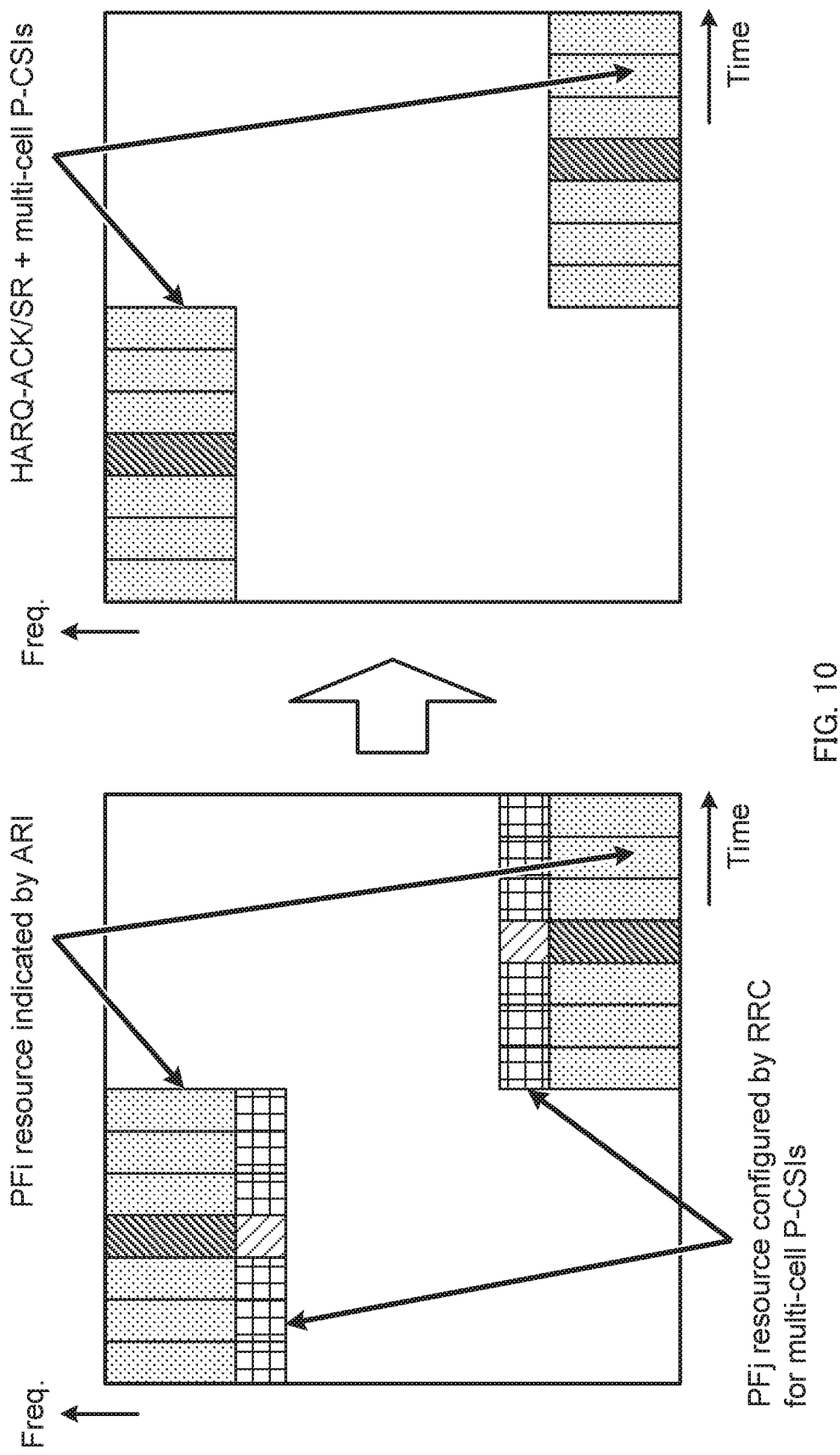
FIG. 10 is a diagram to show an example of PUCCH resource selection in embodiment 2.1.

FIG. 10 is a diagram to show an example of PUCCH resource selection in embodiment 2.1. In FIG. 10, the resources of PFi are configured as PF resources corresponding to ARIs. In addition, resources of PFj are configured by RRC signaling as resources for P-CSIs of multiple cells. In the case of FIG. 10, the UE multiplexes HARQ-ACK/SR and CSI using PFi resources specified by ARI.

The UE determines the resources to multiplex the UCI based on ARI. If the total payload size or total coding rate of UCI exceeds a predetermined configuration value, the UE drops a part or all of the P-CSI (for example, the ratio of the PUCCH resource size to the total number of bits of UCI). Note that the UE can drop UCI according to a predetermined rule (for example, using the priority rule described above, the drop rule of Rel. 8-12, etc.).

Further, the predetermined configuration value used for determining the drop may be configured by higher layer signaling (for example, RRC signaling), downlink control information (for example, DCI), combinations thereof, and the like. The predetermined configuration value to be compared with the total payload size and the predetermined configuration value to be compared with the total coding rate may be different, and only one of these configuration values may be configured, or both may be configured.

For example, the UE reduces the number of P-CSIs so that the sum of the size of the information to be included in the UCI is smaller than the size of the PUCCH resource determined by the ARI, and transmits the HARQ-ACK/SR in the above PUCCH resource (if there is one or more CSI that is not dropped, this CSI is also included).

According to above-described embodiment 2.1, the PF to use for UCI transmission can be controlled according to HARQ-ACK/SR, which is the most important information. Also, since the UE always determines PUCCH resources based on ARIs, the network can control PUCCH resource on a per subframe basis and flexibly allocate resources.

[Embodiment 2.2]

In embodiment 2.2, the UE determines the PF and resources to use for UCI transmission based on the configuration of multiple cells' P-CSIs. In embodiment 2.2, in the timing (for example, subframe) at which multiple cells' P-CSIs are transmitted, the UE multiplexes HARQ-ACK/SR and CSI on the resource for the multiple cells' P-CSIs irrespective of whether or not the resource of the PF corresponding to the ARI exists at the relevant timing. In some exceptional cases, HARQ-ACK/SR may be multiplexed on HARQ-ACK/SR resource.

Figure 11:
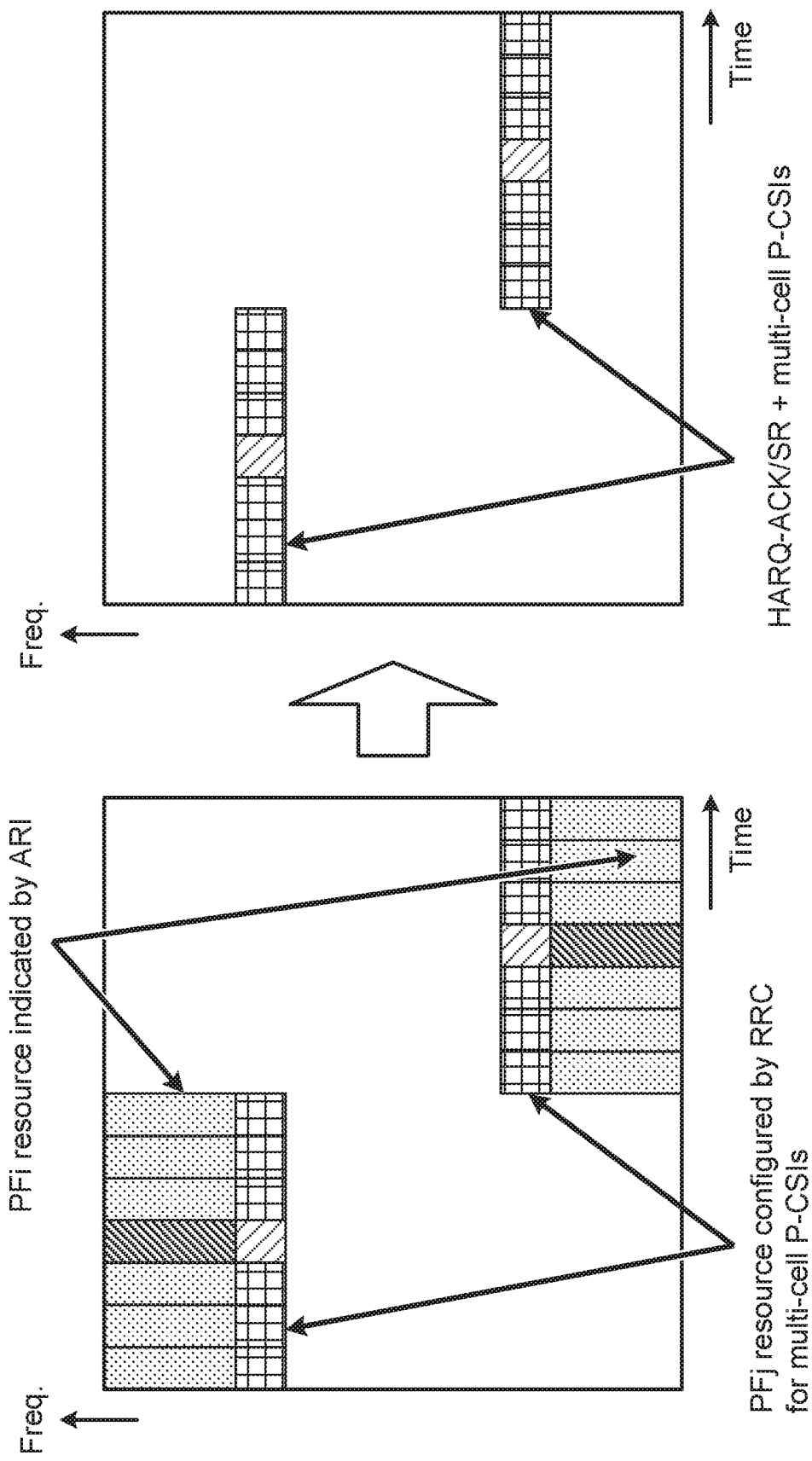
FIG. 11 is a diagram to show an example of PUCCH resource selection in embodiment 2.2.

FIG. 11 is a diagram to show an example of PUCCH resource selection in embodiment 2.2. In FIG. 11, PFi's resources are configured as PF resources corresponding to the ARI. In addition, resources of PFj are configured by RRC signaling as resources for the multiple cells' P-CSIs. In the case of FIG. 11, the UE multiplexes HARQ-ACK/SR and CSI using resources of PFj configured by RRC signaling.

As explained in 2.1, if the total payload size or the total coding rate of UCI exceeds a predetermined value, the UE drops a part or all of the P-CSIs.

Also, when the payload size or the coding rate of HARQ-ACK/SR exceeds a predetermined value, the UE multiplexes at least HARQ-ACK/SR on PF resources specified by the ARI. The UE may further multiplex P-CSIs on the PF resources specified by the ARI, or, in this case, the UE may drop some or all of the P-CSIs.

If resources of a plurality of PFs are configured as PF resources corresponding to an ARI, as explained in embodiment 2.1, the UE can determine one PF based on the number of HARQ-ACK bits. Also, if the payload size or coding rate of HARQ-ACK/SR exceeds a predetermined value, the P-CSI may be multiplexed on PF resources configured by RRC signaling.

According to above-described embodiment 2.2, since HARQ-ACK/SR can be included in PUCCH resources configured by RRC signaling, it is possible to avoid a situation in which PUCCH resources are not used and wasted, and it is possible to suppress a decrease in resource utilization efficiency.

[Embodiment 2.3]

In embodiment 2.3, the UE determines the PF and resources to use for UCI transmission based on the total payload size of UCI.

The UE calculates the total payload size of UCI to be transmitted. Next, the UE determines whether the ARI-specified PF and its resources (HARQ-ACK resource), the RRC-configured PF and its resources (multiple Cell P-CSI resource) can accommodate the total payload size. That is, when UCI is allocated to these resources, the UE checks whether the conditions for the maximum payload size and the maximum coding rate that can be supported are satisfied.

When there is only one PF and one resource satisfying the above conditions, the UE transmits the UCI using this PF and the resource.

If there are no PFs and resources that satisfy the above condition, the UE may drop some or all of the P-CSIs and transmit the HARQ-ACK/SR using a predetermined PF and resource (if there is one or more CSIs that is not dropped, this CSI is included). Here, the predetermined PF resource may be ARI-specified PF and resource, PF having the maximum capacity and its resource. When using the former, resource allocation can be flexibly performed, and when the latter is used, the number of P-CSI dropped can be suppressed.

Also, if there are multiple (for example, two) PFs and resources satisfying the above conditions, the UE may preferentially use one for UCI transmission. For example, the UE may choose to always use PF and resources specified by ARI for UCI transmission. Also, information on priority resources may be reported to the UE by higher layer signaling or the like. In this case, the UE can specify the resources to be used preferentially (for example, resources configured with RRC) based on the information.

Alternatively, if there are a plurality of PFs and resources that satisfy the above condition, the UE compares the payload size of the HARQ-ACK/SR in the transmission subframe of the UCI with the payload size of the CSI, and decide the PF and resources to use for UCI transmission.

For example, the PF and resources corresponding to information occupying the majority of the UCI's total payload can be used for UCI transmission. To be more specific, if the number of HARQ-ACK/SR bits is greater than or equal to the number of P-CSI bits, the UE may use the PF and resources specified in ARI for UCI transmission, otherwise (if the number of bits in HARQ-ACK/SR is less than the number of bits in P-CSI), the UE may use PF and resources configured in RRC for UCI transmission.

As a result, according to the content of UCI, allocation can be performed with emphasis on the original use (HARQ-ACK, P-CSI, etc.) of each PUCCH resource. If the total payload size or the total coding rate of the UCI exceeds a predetermined value, the UE can drop a part or all of the P-CSI.

According to the above described embodiment 2.3, it is possible to schedule flexible PUCCH transmission using ARIs as much as possible. Also, even if all UCI payloads do not fit in ARI-specified PF and resources, they can be multiplexed into RRC-configured PF and its resources.

(Embodiment 2.4)

In Embodiment 2.4, the UE determines the PF and resources to use for UCI transmission based on the comparison of the payloads of HARQ-ACK/SR and P-CSI included in the UCI. This embodiment is equivalent to comparing the payload size of HARQ-ACK/SR with the payload size of CSI, omitting the judgment based on UCI's total payload size in embodiment 2.3, and so the explanation will be omitted.

According to embodiment 2.4, it is easy to judge the PF and resources to use for UCI transmission based on information contained more in UCI.

<Variation>

In the above embodiments, the following variations may be introduced. For example, if there is no HARQ-ACK to be transmitted but SR and one P-CSI need to be transmitted, the UE may drop P-CSI and transmit the SR using PF 1, or the UE may send SR and one P-CSI in either PF 3, PF 4 or PF 5 using RRC-configured resource.

Also, if there is an HARQ-ACK to be sent but ARI is not available (for example, no ARI has been received) and it is also necessary to send one P-CSI, the UE may transmit the HARQ-ACK and one P-CSI using PF 2a/2b, or the UE may transmit HARQ-ACK and one P-CSI in either PF 3, PF 4 or PF 5 using RRC-configured resource.

The radio base station may monitor all the resources where UCI may be received from predetermined UEs, or the radio base station may monitor only some resources when the recognition of the resource transmitting and receiving the UCI does not differ between the UE and the radio base station.

Note that the radio communication methods of the above-described embodiments may be applied individually or may be applied in combination. For example, each embodiment may be appropriately used for each subframe.

Also, in each of the above embodiments, an example in which an uplink signal is transmitted with an SC-FDMA symbol is shown, but this is not limiting. For example, the present invention can be applied even when uplink signals are transmitted in other symbol formats such as OFDMA (Orthogonal Frequency Division Multiple Access) symbols.

(Radio Communication System)

Now, the structure of the radio communication system according to one or more embodiments of the present invention will be described below. In this radio communication system, communication is performed using any one of or a combination of the radio communication methods according to the above embodiments of the present invention.

Figure 12:
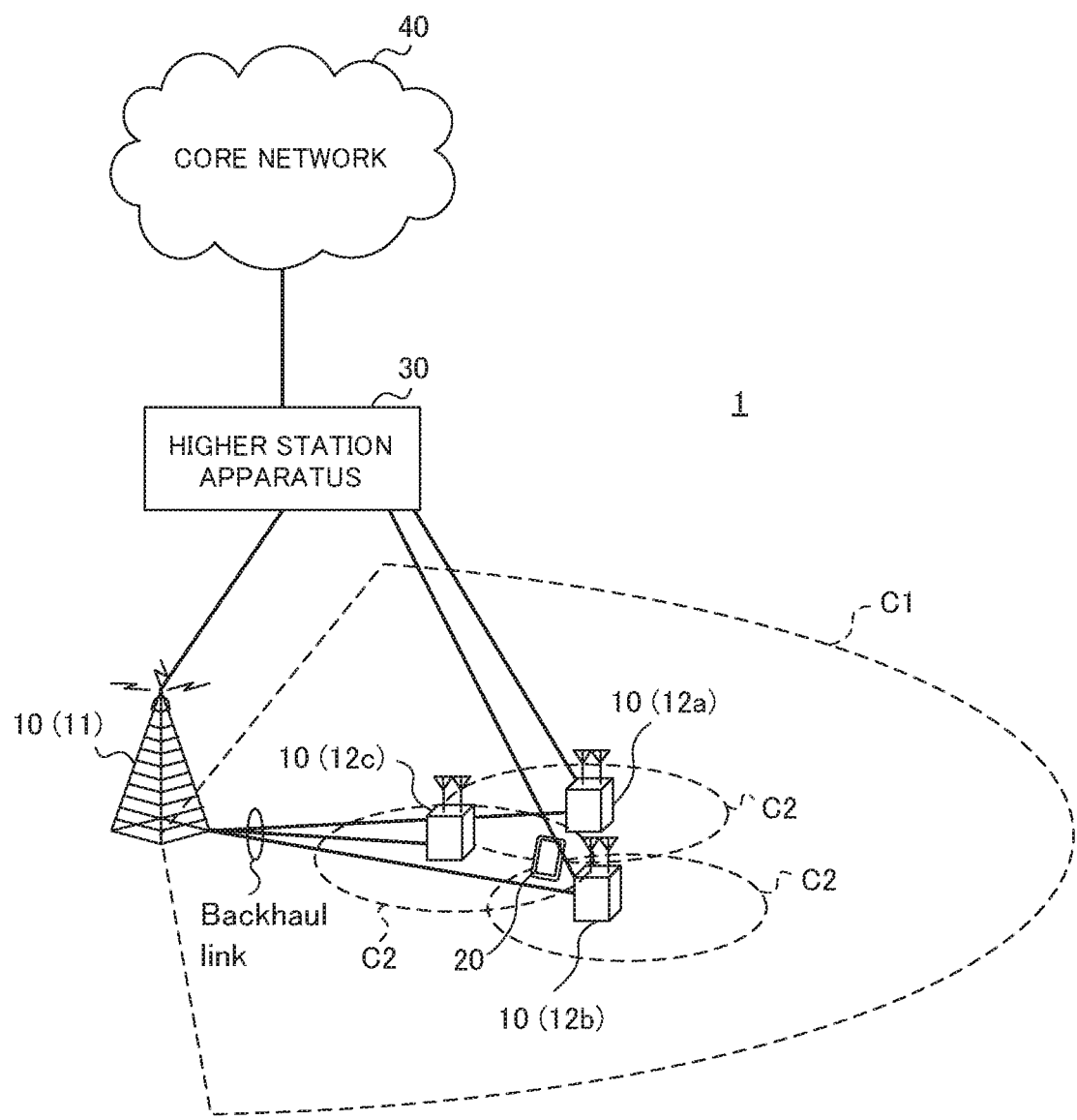
FIG. 12 is a diagram to show an example of a schematic structure of a radio communication system in accordance with embodiments of the invention.

FIG. 12 is a diagram to show an example of a schematic structure of a radio communication system according to one or more embodiments of the present invention. The radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE" (Long Term Evolution), "LTE-A" (LTE-Advanced), "LTE-B" (LTE-Beyond), "SUPER 3G," "IMT-Advanced," "4G" (4th generation mobile communication system), "5G" (5th generation mobile communication system), "FRA" (Future Radio Access), "New-RAT" (Radio Access Technology) and so on, or may be seen as a system to implement these.

The radio communication system 1 shown in FIG. 12 includes a radio base station 11 that forms a macro cell C1, and radio base stations 12 (12a to 12c) that form small cells C2, which are placed within the macro cell C1 and which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2, which use different frequencies, at the same time, by means of CA or DC. Further, the user terminal 20 may apply CA or DC using a plurality of cells (CC) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the configuration of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pico base stations," "femto base stations," "HeNBs" (Home eNodeBs), "RRHs" (Remote Radio Heads), "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. The PDSCH may be referred to as a "down link data channel." User data, higher layer control information and predetermined SIBs (System Information Blocks) are communicated in the PDSCH. Also, the MIB (Master Information Blocks) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI) including PDSCH and PUSCH scheduling information is communicated by the PDCCH. The number of OFDM symbols for use for the PDCCH is communicated by the PCFICH. Delivery acknowledgment information (also referred to as retransmission control information, HARQ-ACK, ACK/NACK, etc.) of HARQ (Hybrid Automatic Repeat reQuest) for PUSCH is transmitted by PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. The PUSCH may be referred to as an uplink data channel. User data and higher layer control information are communicated by the PUSCH. Furthermore, uplink control information (UCI) such as downlink radio quality information (CQI: Channel Quality Indicator), delivery acknowledgement information (ACK/NACK) and so on are communicated by the PUCCH. By means of the PRACH, random access preambles for establishing connections with cells are communicated.

In the radio communication systems 1, the cell-specific reference signal (CRS: Cell-specific Reference Signal), the channel state information reference signal (CSI-RS: Channel State Information-Reference Signal), the demodulation reference signal (DMRS: DeModulation Reference Signal), the positioning reference signal (PRS: Positioning Reference Signal) and so on are communicated as downlink reference signals. Also, in the radio communication system 1, the measurement reference signal (SRS: Sounding Reference Signal), the demodulation reference signal (DMRS) and so on are communicated as uplink reference signals.

Note that, DMRSs may be referred to as "user terminal-specific reference signals" (UE-specific Reference Signals). Also, the reference signals to be communicated are by no means limited to these.

(Radio Base Station)

Figure 13:
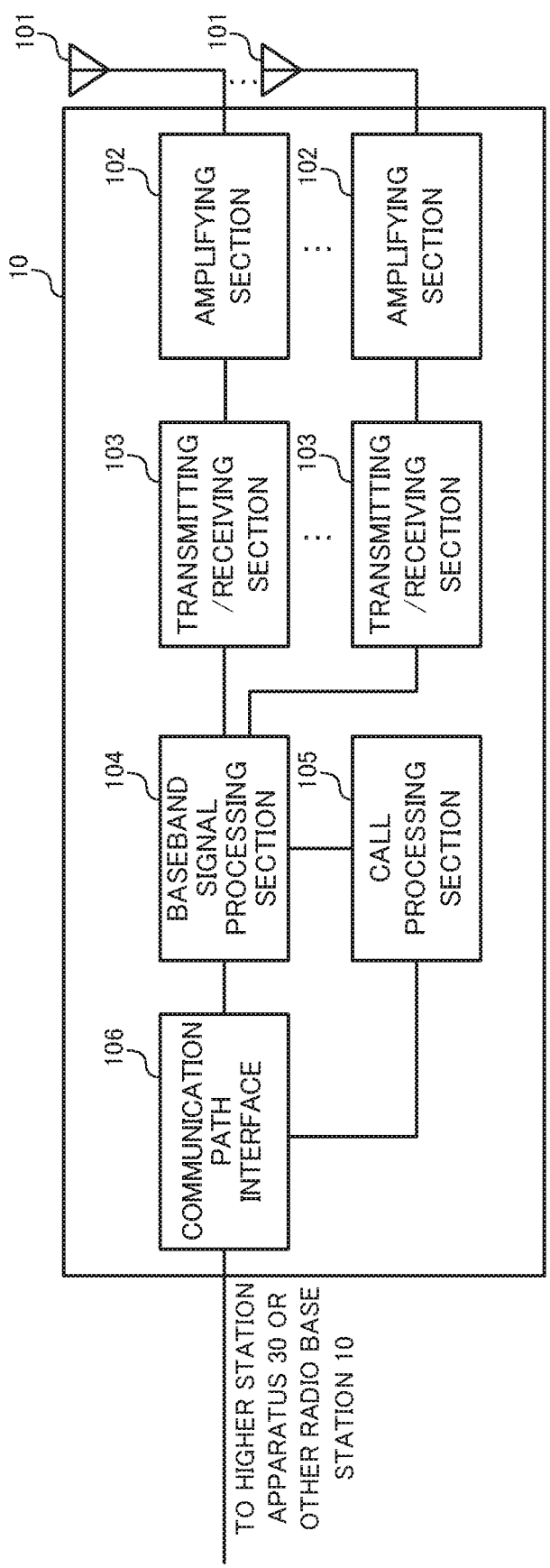
FIG. 13 is a diagram to show an example of an overall structure of a radio base station in accordance with embodiments of the invention.

FIG. 13 is a diagram to show an example of an overall structure of a radio base station according to one or more embodiments of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving devices that can be described based on common understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (for example, an interface in compliance with the CPRI (Common Public Radio Interface) m such as optical fiber, the X2 interface).

Note that the transmitting/receiving section 103 transmits a reference signal (for example, CRS, CSI-RS, etc.) for measuring the channel state, to the user terminal 20. The transmitting/receiving section 103 transmits DCI related to data transmission and/or reception to the user terminal 20. For example, the transmitting/receiving section 103 may transmit downlink shared channel (PDSCH) reception command information (also referred to as DL grant, DL assignment, etc.) for a predetermined CC. Further, the transmitting/receiving section 103 may transmit uplink shared channel (PUSCH) transmission command information (also referred to as UL grant) for a predetermined CC. Further, after the DL grant is transmitted, the transmitting/receiving section 103 transmits downlink data (PDSCH) at a predetermined timing.

The transmitting/receiving sections 103 transmit DCI including ACK/NACK resource indicators (ARIs). The transmitting/receiving sections 103 may transmit information on the correspondence relationship between PUCCH resources and ARIs. Note that the transmitting/receiving sections 103 may transmit different information for a plurality of PFs as the information on the correspondence.

Further, the transmitting/receiving sections 103 receive UCI including HARQ-ACKs from the user terminal 20 by using specific PFs and specific resources determined by the control section 301 to be described later. Further, the transmitting/receiving sections 103 may receive UCI including P-CSIs of one or more CCs (one CC or plural CCs) using specific PFs and specific resources, or may receive UCI including SRs. Further, at the timing determined by the control section 301, the transmitting/receiving sections 103 may receive uplink data on an uplink shared channel (PUSCH).

Figure 14:
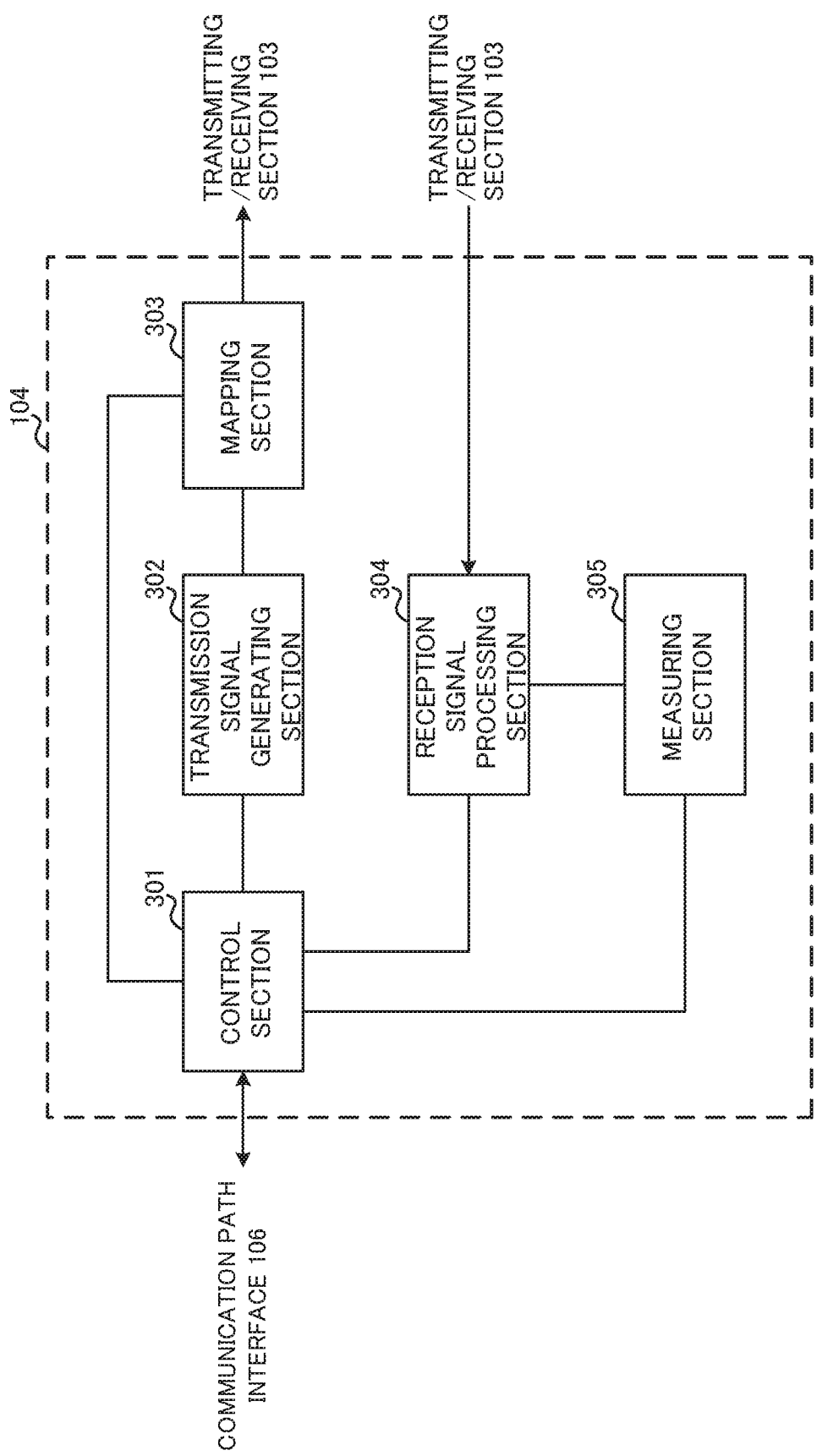
FIG. 14 is a diagram to show an example of a functional structure of a radio base station in accordance with embodiments of the invention.

FIG. 14 is a diagram to show an example of a functional structure of a radio base station according to one or more embodiments of the present invention. Note that, although FIG. 14 primarily shows functional blocks that pertain to characteristic parts of the present embodiments, the radio base station 10 has other functional blocks that are necessary for radio communication as well. As shown in FIG. 14, the baseband signal processing section 104 has a control section (scheduler) 301, a transmission signal generating section 302, a mapping section 303, a received signal processing section 304 and a measurement section 305.

The control section (scheduler) 301 controls the whole of the radio base station 10. The control section 301 can be constituted by a controller, a control circuit or a control device that can be described based on common understanding of the technical field to which the present invention pertains.

The control section 301, for example, controls the generation of signals in the transmission signal generating section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of downlink data signals that are transmitted in the PDSCH and downlink control signals that are communicated in the PDCCH and/or the EPDCCH. Also, the control section 301 controls the scheduling of downlink reference signals such as synchronization signals (the PSS (Primary Synchronization Signal) and the SSS (Secondary Synchronization Signal)), the CRS, the CSI-RS, the DM-RS and so on.

Also, the control section 301 controls the scheduling of uplink data signals transmitted in the PUSCH, uplink control signals transmitted in the PUCCH and/or the PUSCH (for example, delivery acknowledgement signals (HARQ-ACKs)), random access preambles transmitted in the PRACH, uplink reference signals and so on.

When acquiring UCI received from the user terminal 20 from the received signal processing section 304, the control section 301 performs data retransmission control and scheduling control on the user terminal 20 based on this UCI. For example, when acquiring an HARQ-ACK from the received signal processing section 304, the control section 301 determines whether or not retransmission to the user terminal 20 is necessary, and performs control so as to perform retransmission processing when necessary.

To be more specific, the control section 301 controls to receive UCI including at least HARQ-ACKs, in specific PFs and specific resources. The UCI may include SRs or one or more CSIs.

The control section 301 performs control so that, for a timing (same TTI) at which UCI is received, a specific PF and specific resources are determined based on whether a given user terminal 20 is configured to transmit one or more CSIs (including P-CSI) and the payload size of at least part of the UCI. The control section 301 can determine the payload size of at least a part of the UCI based on the scheduling status of the user terminal 20, transmitted downlink control information, RRC signaling, and the like.

If a given user terminal 20 is not configured to transmit CSI at UCI transmission timing, the control section 301 performs control so that a specific PF is determined based on the payload size of the HARQ-ACK/SR and a specific resource is determined based on the ARI notified in DCI (the first embodiment). In this case, the control section 301 can determine the PF to be observed, based on how many corresponding relationships between PUCCH resources and ARI are configured in a predetermined user terminal 20.

Also, when a predetermined user terminal 20 is configured to transmit CSI at the transmission timing of UCI, the control section 301 performs control so that a specific PF and/or resource is determined based on the payload size of at least part (or all) of the UCI (second embodiment). For example, the control section 301 may determine a specific PF and/or resource based on at least one of the methods shown in embodiments 2.1 to 2.4.

Note that the control section 301 may perform control so that all PFs/resources that may be received from the UCI from a predetermined user terminal 20 are observed (reception processing), or the control section 301 may perform control so that only a part of the PFs/resources are observed.

The transmission signal generating section 302 generates downlink signals (downlink control signals, downlink data signals, downlink reference signals and so on) based on commands from the control section 301, and outputs these signals to the mapping section 303. The transmission signal generating section 302 can be constituted by a signal generator, a signal generating circuit or a signal generating device that can be described based on common understanding of the technical field to which the present invention pertains.

For example, the transmission signal generating section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are determined based on, for example, channel state information (CSI: Channel State Information) reported from each user terminal.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or a mapping device that can be described based on common understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals and so on). For the received signal processing section 304, a signal processor, a signal processing circuit or a signal processing device that can be described based on common understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or a measurement device that can be described based on common understanding of the technical field to which the present invention pertains.

Also, by using the received signals, the received signal processing section 304 may measure the received power (for example, RSRP (Reference Signal Received Power)), the received quality (for example, RSRQ (Reference Signal Received Quality)), channel states and so on. The measurement results may be output to the control section 301.

(User terminal)

Figure 15:
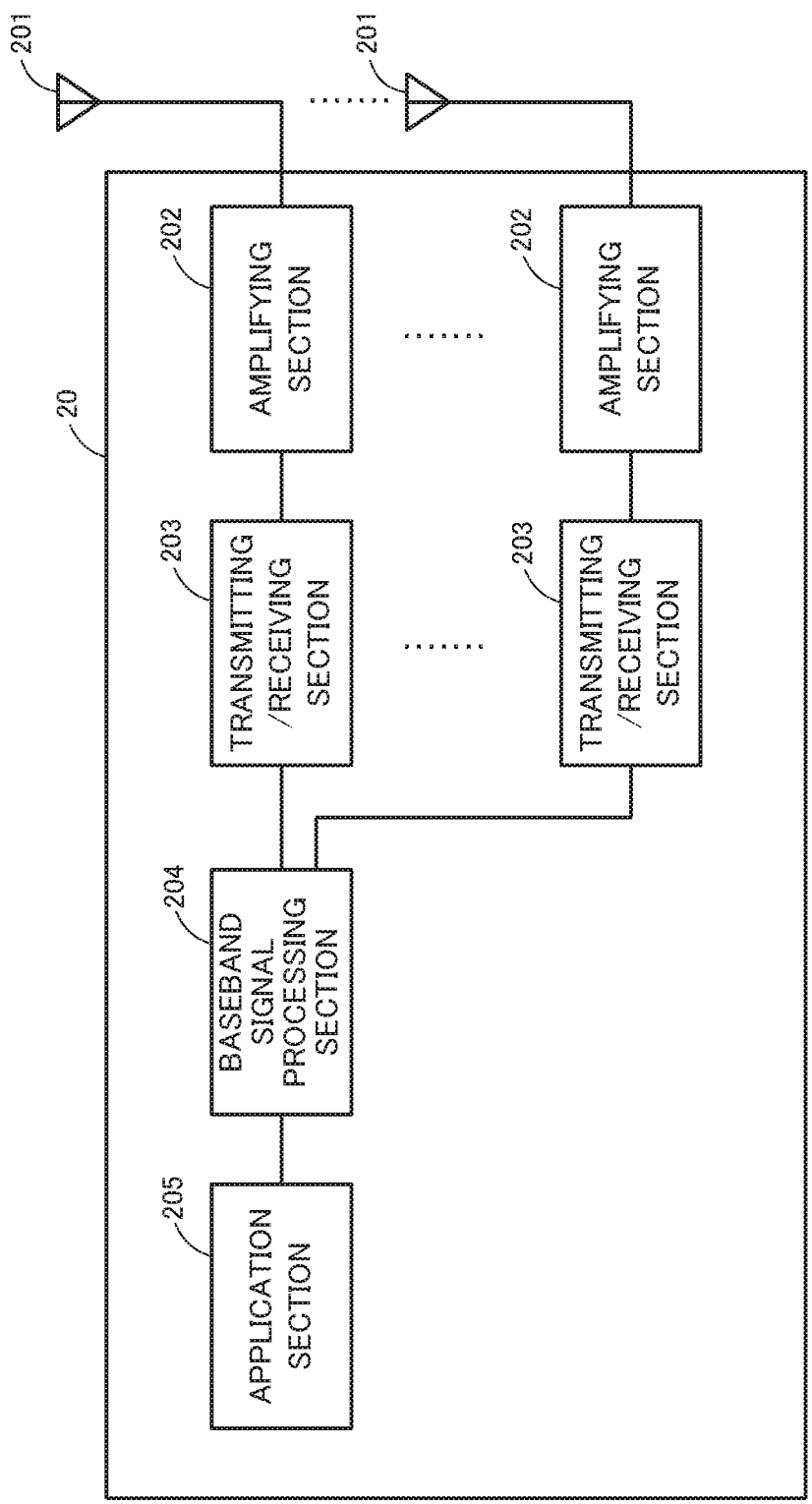
FIG. 15 is a diagram to show an example of an overall structure of a user terminal in accordance with embodiments of the invention.

FIG. 15 is a diagram to show an example of an overall structure of a user terminal according to one or more embodiments of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

A radio frequency signal that is received in the transmitting/receiving antenna 201 is amplified in the amplifying section 202. The transmitting/receiving section 203 receives the downlink signal amplified in the amplifying section 202. The received signal is subjected to frequency conversion and converted into the baseband signal in the transmitting/receiving sections 203, and output to the baseband signal processing section 204. The transmitting/receiving section 203 can be constituted by a transmitters/receiver, a transmitting/receiving circuit or a transmitting/receiving device that can be described based on common understanding of the technical field to which the present invention pertains. Note that the transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to the transmitting/receiving section 203. The baseband signal that is output from the baseband signal processing section 204 is converted into a radio frequency bandwidth in the transmitting/receiving sections 203. The radio frequency signals that are subjected to frequency conversion in the transmitting/receiving sections 203 are amplified in the amplifying sections 202, and transmitted from the transmitting/receiving antennas 201.

Note that the transmitting/receiving section 203 receives a reference signal for measuring the channel state from the radio base station 10 (for example, CRS, CSI-RS, etc.). The transmitting/receiving section 203 receives DCI related to data transmission and/or reception from the radio base station 10. For example, the transmitting/receiving section 203 may receive a DL grant for a predetermined CC. Further, the transmitting/receiving section 203 may receive the UL grant for the predetermined CC. Further, the transmitting/receiving section 203 receives downlink data (PDSCH) at a timing determined based on the DL grant.

The transmitting/receiving section 203 receives DCI including ARIs. The transmitting/receiving section 203 may receive information on the correspondence relationship between PUCCH resources and ARIs. Note that the transmitting/receiving section 203 may receive different information on a plurality of PFs as the information on the correspondence.

Further, the transmitting/receiving section 203 transmits UCI including HARQ-ACKs in response to downlink data transmitted on the downlink shared channel (PDSCH) to the radio base station 10 using specific PFs and specific resources selected by the control section 401. The transmitting/receiving section 203 may transmit UCI including P-CSI of one or more CCs or may transmit UCI including SRs using specific PFs and specific resources (one CC or multiple CCs). Further, the transmitting/receiving section 203 may transmit the uplink data with the uplink shared channel (PUSCH) at the timing determined by the control section 401 based on the UL grant.

Figure 16:
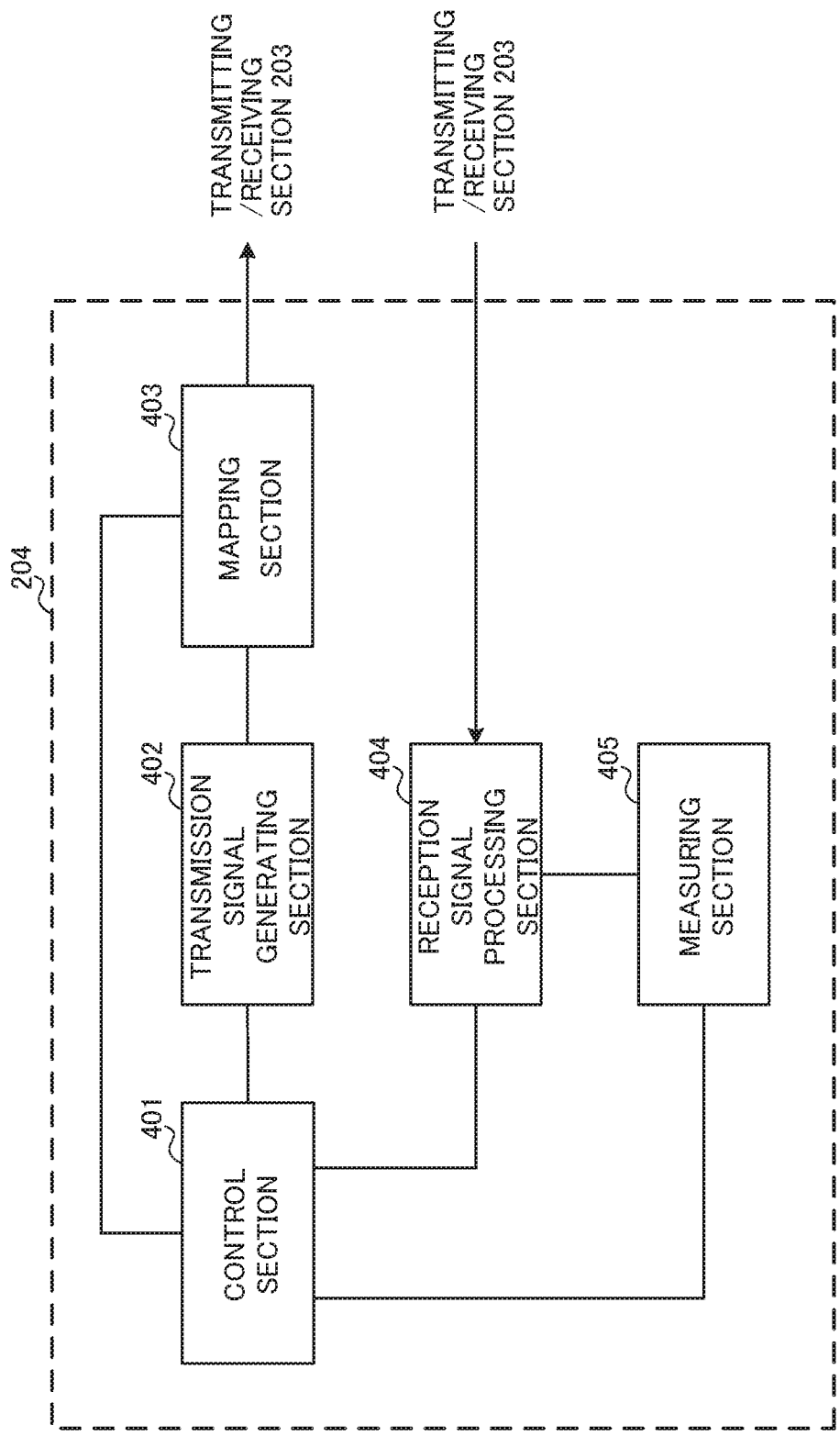
FIG. 16 is a diagram to show an example of a functional structure of a user terminal in accordance with embodiments of the invention.

FIG. 16 is a diagram to show an example of a functional structure of a user terminal according to one or more embodiments of the present invention. Note that, although FIG. 16 primarily shows functional blocks that pertain to characteristic parts of the present embodiments, the user terminal 20 has other functional blocks that are necessary for radio communication as well. As shown in FIG. 16, the baseband signal processing section 204 provided in the user terminal 20 at least has a control section 401, a transmission signal generating section 402, a mapping section 403, a received signal processing section 404 and a measurement section 405.

The control section 401 controls the whole of the user terminal 20. For the control section 401, a controller, a control circuit or a control device that can be described based on common understanding of the technical field to which the present invention pertains can be used.

The control section 401, for example, controls the generation of signals in the transmission signal generating section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals (signals transmitted in the PDCCH/EPDCCH) and downlink data signals (signals transmitted in the PDSCH) transmitted from the radio base station 10, from the received signal processing section 404. The control section 401 controls the generation of uplink control signals (for example, delivery acknowledgement signals (HARQ-ACKs) and so on) and uplink data signals based on the downlink control signals, the results of deciding whether or not re transmission control is necessary for the downlink data signals, and so on.

To be more specific, the control section 401 controls specific PFs and specific resources to use to transmit UCI including at least HARQ-ACKs. The control section 401 may configure UCI to include SRs, or the control section 401 may configure UCI to include periodic CSIs (P-CSI) generated based on the channel state of each CC output from the measurement section 405.

The control section 401 determines the specific PF and specific resources based on whether or not the user terminal 20 is configured to transmit one or more CSIs (including P-CSI) at the timing of transmitting UCI (the same TTI) and based on at least a part of the payload size.

When the control section 401 is not configured to transmit CSI at the transmission timing of UCI, the control section 401 determines a specific PF based on the payload size of HARQ-ACK/SR and determines specific resource based on ARI reported from the radio base station 10 (first embodiment). In this case, the control section 401 can determine the PF to be selected based on how many correspondences between the PUCCH resource and the ARI are configured in the user terminal 20.

Further, when the control section 401 is configured to transmit CSI at the transmission timing of UCI, the control section 401 selects a specific PF and/or a resource based on the payload size of at least part (or all) of the UCI (second embodiment). For example, the control section 401 may determine a specific PF and/or resource based on at least one of the methods shown in embodiments 2.1 to 2.4.

Note that when all the UCIs to be transmitted cannot be included in the specific PF and the specific resource, the control section 401 can control the P-CSI to be dropped or the like.

The transmission signal generating section 402 generates uplink signals (uplink control signals, uplink data signals, uplink reference signals and so on) based on commands from the control section 401, and outputs these signals to the mapping section 403. The transmission signal generating section 402 can be constituted by a signal generator, a signal generating circuit or a signal generating device that can be described based on common understanding of the technical field to which the present invention pertains.

For example, the transmission information generating section 402 generates uplink control signals such as delivery acknowledgement signals (HARQ-ACKs), channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generating section 402 to radio resources based on commands from the control section 401, and output the result to the transmitting/receiving sections 203. The mapping section 403 can be constituted by a mapper, a mapping circuit or a mapping device that can be described based on common understanding of the technical field to which the present invention pertains.

The received signal processing section 404 performs receiving processes (for example, demapping, demodulation, decoding and so on) of received signals that are input from the transmitting/receiving section 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or a signal processing device that can be described based on common understanding of the technical field to which the present invention pertains. Also, the received signal processing section 404 can constitute the receiving section according to one or more embodiments of the present invention.

The received signal processing section 404 output the decoded information that is acquired through the receiving processes to the control section 401. The received signal processing section 404 outputs, for example, broadcast information, system information, RRC signaling, DCI and so on, to the control section 401. Also, the received signal processing section 404 outputs the received signals, the signals after the receiving processes and so on to the measurement section 405.

The measurement section 405 conducts measurements with respect to the received signals. The measurement section 405 can be constituted by a measurer, a measurement circuit or a measurement device that can be described based on common understanding of the technical field to which the present invention pertains.

The measurement section 405 may measure, for example, the received power (for example, RSRP), the received quality (for example, RSRQ), the channel states and so on of the received signals. For example, the measurement section 405 may measure channel states of each configured CC using a predetermined reference signal (for example, CRS, CSI-RS, etc.). The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be implemented with one physically-integrated device, or may be implemented by connecting two physically-separate devices via radio or wire and using these multiple devices.

Figure 17:
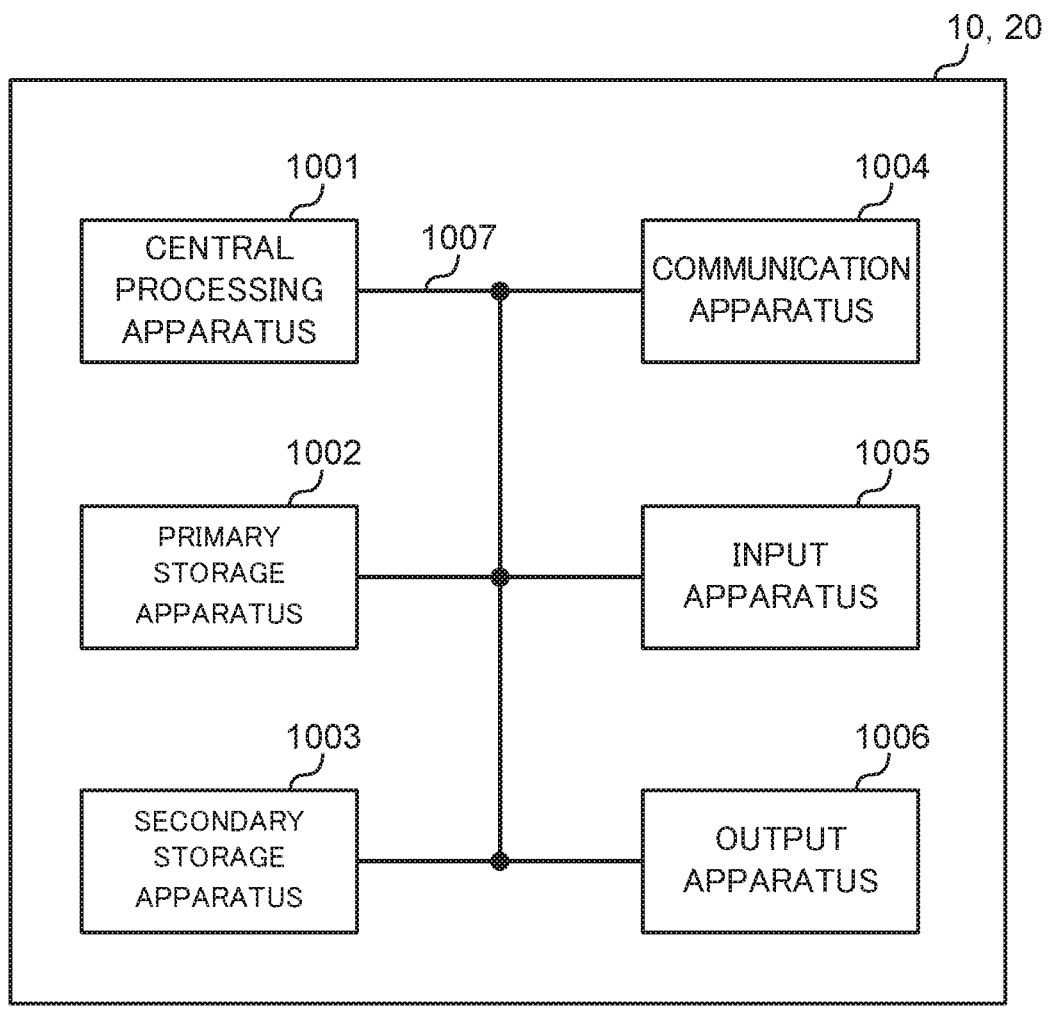
FIG. 17 is a diagram to show an example hardware structure of a radio base station and a user terminal in accordance with embodiments of the invention.

That is, a radio base station, a user terminal and so on according to embodiments of the present invention may function as a computer that executes the processes of the radio communication method of the present invention. FIG. 17 is a diagram to show an example hardware structure of a radio base station and a user terminal according to embodiments of the present invention. Physically, a radio base station 10 and a user terminal 20, which have been described above, may be formed as a computer apparatus that includes a central processing apparatus (processor) 1001, a primary storage apparatus (memory) 1002, a secondary storage apparatus 1003, a communication apparatus 1004, an input apparatus 1005, an output apparatus 1006 and a bus 1007. Note that, in the following description, the word "apparatus" may be replaced by "circuit," "device," "unit" and so on.

Each function of the radio base station 10 and user terminal 20 is implemented by reading predetermined software (programs) on hardware such as the central processing apparatus 1001, the primary storage apparatus 1002 and so on, and controlling the calculations in the central processing apparatus 1001, the communication in the communication apparatus 1004, and the reading and/or writing of data in the primary storage apparatus 1002 and the secondary storage apparatus 1003.

The central processing apparatus 1001 may control the whole computer by, for example, running an operating system. The central processing apparatus 1001 may be formed with a processor (CPU: Central Processing Unit) that includes a control apparatus, a calculation apparatus, a register, interfaces with peripheral apparatus, and so on. For example, the above-described baseband signal process section 104 (204), call processing section 105 and so on may be implemented by the central processing apparatus 1001.

Also, the central processing apparatus 1001 reads programs, software modules, data and so on from the secondary storage apparatus 1003 and/or the communication apparatus 1004, into the primary storage apparatus 1002, and executes various processes in accordance with these. As for the programs, programs to allow the computer to execute at least part of the operations of the above-described embodiments may be used. For example, the control section 401 of the user terminal 20 may be stored in the primary storage apparatus 1002 and implemented by a control program that runs on the central processing apparatus 1001, and other functional blocks may be implemented likewise.

The primary storage apparatus (memory) 1002 is a computer-readable recording medium, and may be constituted by, for example, at least one of a ROM (Read Only Memory), an EPROM (Erasable Programmable ROM), a RAM (Random Access Memory) and so on. The secondary storage apparatus 1003 is a computer-readable recording medium, and may be constituted by, for example, at least one of a flexible disk, an opto-magnetic disk, a CD-ROM (Compact Disc ROM), a hard disk drive and so on.

The communication apparatus 1004 is hardware (transmitting/receiving device) for allowing inter-computer communication by using wired and/or wireless networks, and may be referred to as, for example, a "network device," a "network controller," a "network card," a "communication module" and so on. For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, etc.). The output apparatus 1006 is an output device for allowing sending output to the outside (for example, a display, a speaker, etc.). Note that the input apparatus 1005 and the output apparatus 1006 may be provided in an integrated structure (for example, a touch panel).

Also, the apparatuses, including the central processing apparatus 1001, the primary storage apparatus 1002 and so on, may be connected via a bus 1007 to communicate information with each other. The bus 1007 may be formed with a single bus, or may be formed with buses that vary between the apparatuses. Note that the hardware structure of the radio base station 10 and the user terminal 20 may be designed to include one or more of each apparatus shown in the drawings, or may be designed not to include part of the apparatuses.

For example, the radio base station 10 and the user terminal 20 may be structured to include hardware such as an ASIC (Application-Specific Integrated Circuit), a PLD (Programmable Logic Device), an FPGA (Field Programmable Gate Array) and so on, and part or all of the functional blocks may be implemented by the hardware.

Note that the terminology used in this description and the terminology that is needed to understand this description may be replaced by other terms that convey the same or similar meanings. For example, "channels" and/or "symbols" may be replaced by "signals" (or "signaling"). Also, "signals" may be "messages." Furthermore, "component carriers" (CCs) may be referred to as "cells," "frequency carriers," "carrier frequencies" and so on.

Also, the information and parameters described in this description may be represented in absolute values or in relative values with respect to a predetermined value, or may be represented in other information formats. For example, radio resources may be specified by predetermined indices.

The information, signals and/or others described in this description may be represented by using a variety of different technologies. For example, data, instructions, commands, information, signals, bits, symbols and chips, all of which may be referenced throughout the description, may be represented by voltages, currents, electromagnetic waves, magnetic fields or particles, optical fields or photons, or any combination of these.

Also, software and commands may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation and microwaves), these wired technologies and/or wireless technologies are also included in the definition of communication media.

The examples/embodiments illustrated in this description may be used individually or in combinations, and may be switched depending on the implementation. Also, a report of predetermined information (for example, a report to the effect that "X holds") does not necessarily have to be sent explicitly, and can be sent implicitly (by, for example, not reporting this piece of information).

Reporting of information is by no means limited to the example s/embodiments described in this description, and other methods may be used as well. For example, reporting of information may be implemented by using physical layer signaling (for example, DCI (Downlink Control Information) and UCI (Uplink Control Information)), higher layer signaling (for example, RRC (Radio Resource Control) signaling, broadcast information (MIBs (Master Information Blocks) and SIBs (System Information Blocks)) and MAC (Medium Access Control) signaling and so on), other signals or combinations of these. Also, RRC signaling may be referred to as "RRC messages," and can be, for example, an RRC connection setup message, RRC connection reconfiguration message, and so on.

The examples/embodiments illustrated in this description may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other adequate systems, and/or next-generation systems that are enhanced based on these.

The order of processes, sequences, flowcharts and so on that have been used to describe the examples/embodiments herein may be re-ordered as long as inconsistencies do not arise. For example, although various methods have been illustrated in this description with various components of steps in exemplary orders, the specific orders that illustrated herein are by no means limiting.

Now, although the present invention has been described in detail above, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A user terminal configurable with a plurality of component carriers, the user terminal comprising:
   a receiver that receives at least one of downlink control information and Radio Resource Control (RRC) signaling;
   a transmitter that transmits uplink control information (UCI), which includes at least delivery acknowledgment information, in a specific resource, by using a specific Physical Uplink Control Channel (PUCCH) format (PF); and
   a processor that executes control to select the specific PF and the specific resource based on a payload size of at least a part of the UCI,
   wherein, when a plurality of periodic channel state information (P-CSI) is configured to be transmitted at a transmission timing of the UCI and a total payload size of the UCI can be accommodated by a PF and a resource for P-CSI transmission configured by the RRC signaling, the processor determines that the PF and the resource for the P-CSI transmission are the specific PF and the specific resource, and when there is a plurality of resources that can accommodate the total payload size of UCI, the processor determines that the PF and the resource for the P-CSI transmission are the specific PF and the specific resource, based on information configured by RRC signaling.

2. The user terminal according to claim 1, wherein, when at least one of the number of bits of the delivery acknowledgment information and a scheduling request included in the UCI is judged to be equal to or less than a predetermined threshold, the processor determines that a PF 3 and a PF 3 resource specified by the downlink control information are the specific PF and the specific resource, and when the number of bits exceeds the predetermined threshold, the control section determines that a PF 4 and a PF 4 resource specified by the downlink control information, or a PF 5 and a PF 5 resource specified by the downlink control information, are the specific PF and the specific resource.

3. The user terminal according to claim 1, wherein, when there is a resource that is specified by the downlink control information that can accommodate the total payload size of UCI, the processor prioritizes the PF, the resource specified by the downlink control information, and determines that the PF and the resource are the specific PF and the specific resource.

4. The user terminal according to claim 3, wherein, when there are no resources for transmission of the plurality of CSIs that can accommodate the total payload size of UCI and the resource specified by the downlink control information, the transmitter drops all of the periodic CSIs and transmits at least one of the delivery acknowledgment information and the scheduling request.

5. The user terminal according to claim 1, wherein, when there are no resources for transmission of the plurality of CSIs that can accommodate the total payload size of UCI and the resource specified by the downlink control information, the transmitter drops all of the periodic CSIs and transmits at least one of the delivery acknowledgment information and the scheduling request.

6. The user terminal according to claim 1, wherein, when one P-CSI is configured to be transmitted at the transmission timing of the UCI and the resource specified by the downlink control information is not available, the processor executes control so that the delivery acknowledgment information and the one P-CSI are transmitted using a PF 2a/2b.

7. A radio base station that communicates with a user terminal configurable with a plurality of component carriers, the radio base station comprising:

a transmitter that transmits at least one of downlink control information and Radio Resource Control (RRC) signaling; and a receiver that receives uplink control information (UCI), which includes at least delivery acknowledgment information, in a specific resource, using a specific Physical Uplink Control Channel (PUCCH) format (PF), wherein the receiver receives the UCI in the specific resource, which is determined in the user terminal based on a payload size of at least a part of the UCI, wherein, when a plurality of periodic channel state information (P-CSI) is configured to be transmitted at a transmission timing of the UCI and a total payload size of the UCI can be accommodated by a PF and a resource for P-CSI transmission configured by the RRC signaling, the user terminal determines that the PF and the resource for the P-CSI transmission are the specific PF and the specific resource, and when there is a plurality of resources that can accommodate the total payload size of UCI, the user terminal determines that the PF and the resource for the P-CSI transmission are the specific PF and the specific resource, based on information configured by RRC signaling.

8. A radio communication method for a user terminal configurable with a plurality of component carriers, the radio communication method comprising:

receiving at least one of downlink control information and Radio Resource Control (RRC) signaling;

transmitting uplink control information (UCI), which includes at least delivery acknowledgment information, in a specific resource, by using a specific Physical Uplink Control Channel (PUCCH) format (PF); and selecting the specific PF and the specific resource based on a payload size of at least a part of the UCI, wherein, when a plurality of periodic channel state information (P-CSI) is configured to be transmitted at a transmission timing of the UCI and a total payload size of the UCI can be accommodated by a PF and a resource for P-CSI transmission configured by the RRC signaling, the PF and the resource for the P-CSI transmission are determined as the specific PF and the specific resource, and when there is a plurality of resources that can accommodate the total payload size of UCI, the PF and the resource for the P-CSI transmission are determined as the specific PF and the specific resource, based on information configured by RRC signaling.

* * * * *